United States Patent
Quigley et al.

(10) Patent No.: US 10,230,692 B2
(45) Date of Patent: Mar. 12, 2019

(54) DISTRIBUTED STORAGE PROCESSING MODULE

(75) Inventors: John Quigley, Chicago, IL (US); Greg Dhuse, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 12/775,299

(22) Filed: May 6, 2010

(65) Prior Publication Data

US 2010/0332751 A1 Dec. 30, 2010

Related U.S. Application Data

(60) Provisional application No. 61/221,762, filed on Jun. 30, 2009.

(51) Int. Cl.
*H04L 29/06* (2006.01)
*H04L 29/08* (2006.01)
*G06F 12/0866* (2016.01)

(52) U.S. Cl.
CPC ...... *H04L 63/0428* (2013.01); *H04L 67/1097* (2013.01); *H04L 69/08* (2013.01); *G06F 12/0866* (2013.01)

(58) Field of Classification Search
CPC . H04L 63/0428; H04L 67/1097; H04L 69/08; G06F 12/0866
USPC ................... 711/112, 153; 714/763
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A * | 1/1996 | Rabin | 714/762 |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Michael Alsip
(74) *Attorney, Agent, or Firm* — Garlick & Markison; Timothy W. Markison; Patricia A. Markison

(57) ABSTRACT

A dispersed storage (DS) processing module may include a gateway module operable to communicate data and/or corresponding information with a user device and may include an access module operable to segment outbound data of the data into one or more outbound data segments and aggregate one or more inbound data segments into inbound data of the data. The DS processing module may include a grid module operable to encode an outbound data segment of the one or more outbound data segments into a plurality of outbound encoded data slices and decode a plurality of inbound encoded data slices into an inbound data segment of the one or more inbound data segments. The DS processing module may include a storage module operable to output the plurality of outbound encoded data slices to a plurality of DS storage units and receive the plurality of inbound encoded data slices from the plurality of DS storage units.

17 Claims, 23 Drawing Sheets

(56) References Cited

U.S. PATENT DOCUMENTS

| | | |
|---|---|---|
| 6,012,159 A | 1/2000 | Fischer et al. |
| 6,058,454 A | 5/2000 | Gerlach et al. |
| 6,128,277 A | 5/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,397,365 B1 * | 5/2002 | Brewer et al. ............... 714/766 |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,472,178 B2 | 12/2008 | Lisiecki et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 * | 5/2003 | Shu ................................ 707/1 |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0143359 A1 * | 6/2007 | Uppala ........................ 707/202 |
| 2007/0150481 A1 * | 6/2007 | Song et al. ..................... 707/10 |
| 2007/0283167 A1 | 6/2007 | Venters, III et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0239945 A1 | 10/2007 | Li et al. |
| 2007/0282868 A1 * | 12/2007 | Wanigasekara-Mohotti et al. ...... 707/100 |
| 2008/0183975 A1 * | 7/2008 | Foster et al. .................. 711/153 |
| 2009/0094250 A1 * | 4/2009 | Dhuse et al. .................. 707/10 |
| 2009/0094251 A1 | 4/2009 | Gladwin et al. |
| 2009/0094318 A1 | 4/2009 | Gladwin et al. |
| 2009/0094320 A1 | 4/2009 | Palthepu et al. |
| 2010/0023524 A1 | 1/2010 | Gladwin et al. |
| 2010/0218037 A1 * | 8/2010 | Swartz et al. .................. 714/6 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Administration Guide Dispersed Storage Network documentation for the 1.2.0 open source release; Last updated Mar. 29, 2009 14:49:00 CDT (retrieved Aug. 3, 2010 (Aug. 3, 2010)]; Retrieved from the internet <URL: http://dev.cleversafe.org/doc/admin-guide.html>.

International Search Report and Written Opinion dated Aug. 19, 2010; International Application No. PCT/US10/40325.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

European Patent Office; Extended Search Report; EP Application No. 10794620.4; dated Mar. 5, 2015; 7 pgs.

European Patent Office; Communication pursuant to Article 94(3) EPC; EP Application No. 10794620.4; dated Jan. 26, 2018; 4 pgs.

\* cited by examiner

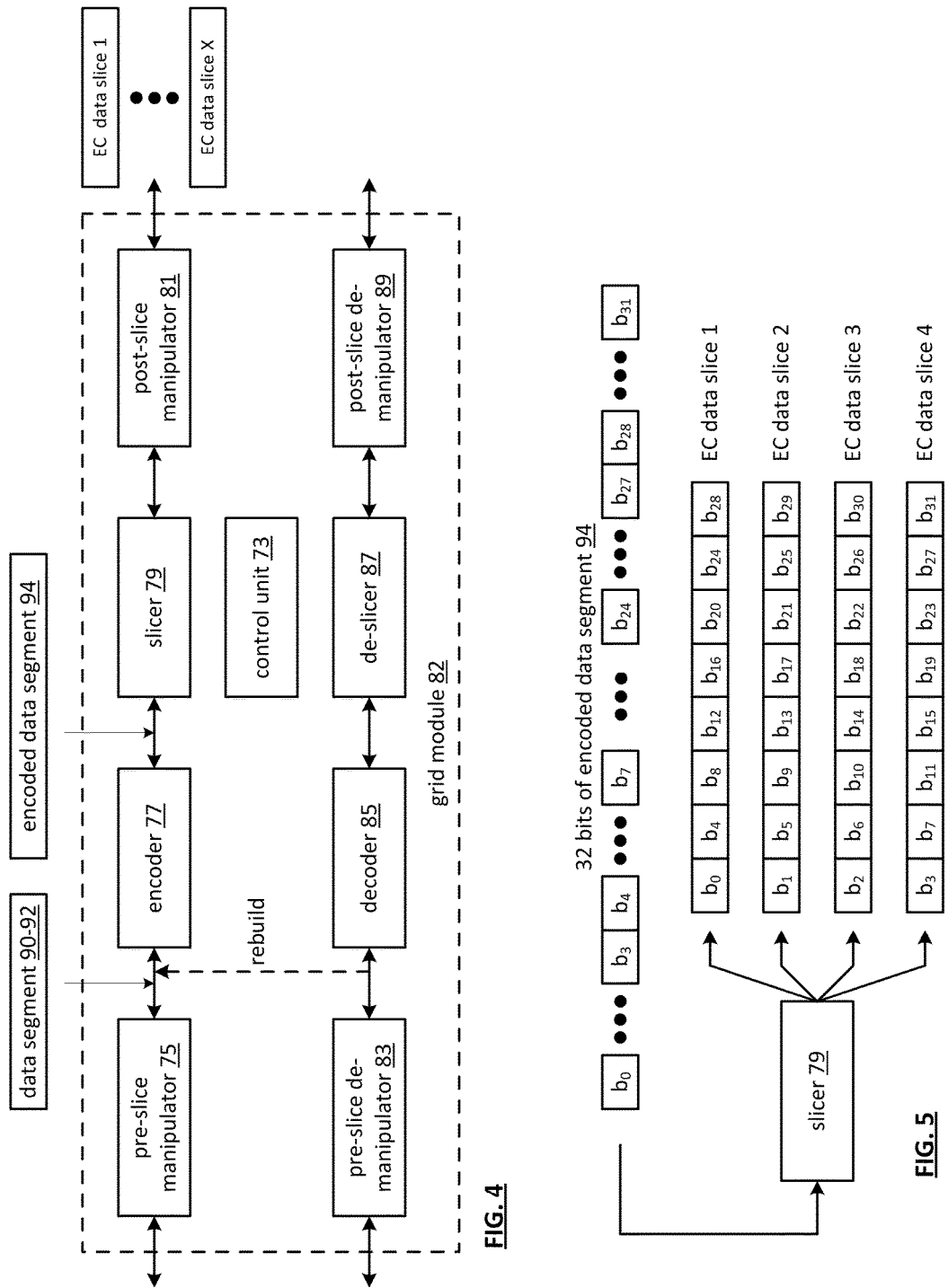

| file | EC slice #1 | EC slice #2 | EC slice #3 | EC slice #4 | | EC slice #X-2 | EC slice #X-1 | EC slice #X |
|---|---|---|---|---|---|---|---|---|
| segment 1 | θ'1_45 | θ'2_45 | θ'3_45 | ••• | | ••• | ••• | ••• |
| segment 2 | | | | | | | | |
| segment 3 | | | | | | | | |
| ••• | ••• | ••• | ••• | ••• | | ••• | ••• | ••• |
| segment Y-2 | | | | | | | | |
| segment Y-1 | | | | | | | | |
| segment Y | θ'1_65 | θ'2_65 | θ'3_65 | ••• | | ••• | ••• | ••• |
| | Virtual DS storage unit A | Virtual DS storage unit B | Virtual DS storage unit C | Virtual DS storage unit D | | Virtual DS storage unit β-2 | Virtual DS storage unit β-1 | Virtual DS storage unit β |

FIG. 11

DISTRIBUTED STORAGE PROCESSING MODULE

CROSS REFERENCE TO RELATED PATENTS

This patent application is claiming priority under 35 USC § 119 to a provisionally filed patent application entitled DISBURSED STORAGE NETWORK INTERFACE MODULE AND APPLICATIONS THEREOF, having a provisional filing date of Jun. 30, 2009, and a provisional Ser. No. 61/221,762.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a diagram of an example embodiment of error coded data slice creation in accordance with the invention;

FIG. 5 is a schematic block diagram of an embodiment of a computing core in accordance with the invention;

FIG. 11 is a diagram of an embodiment of a dispersed storage memory mapping in accordance with the invention;

DETAILED DESCRIPTION OF THE INVENTION

Figure 1:
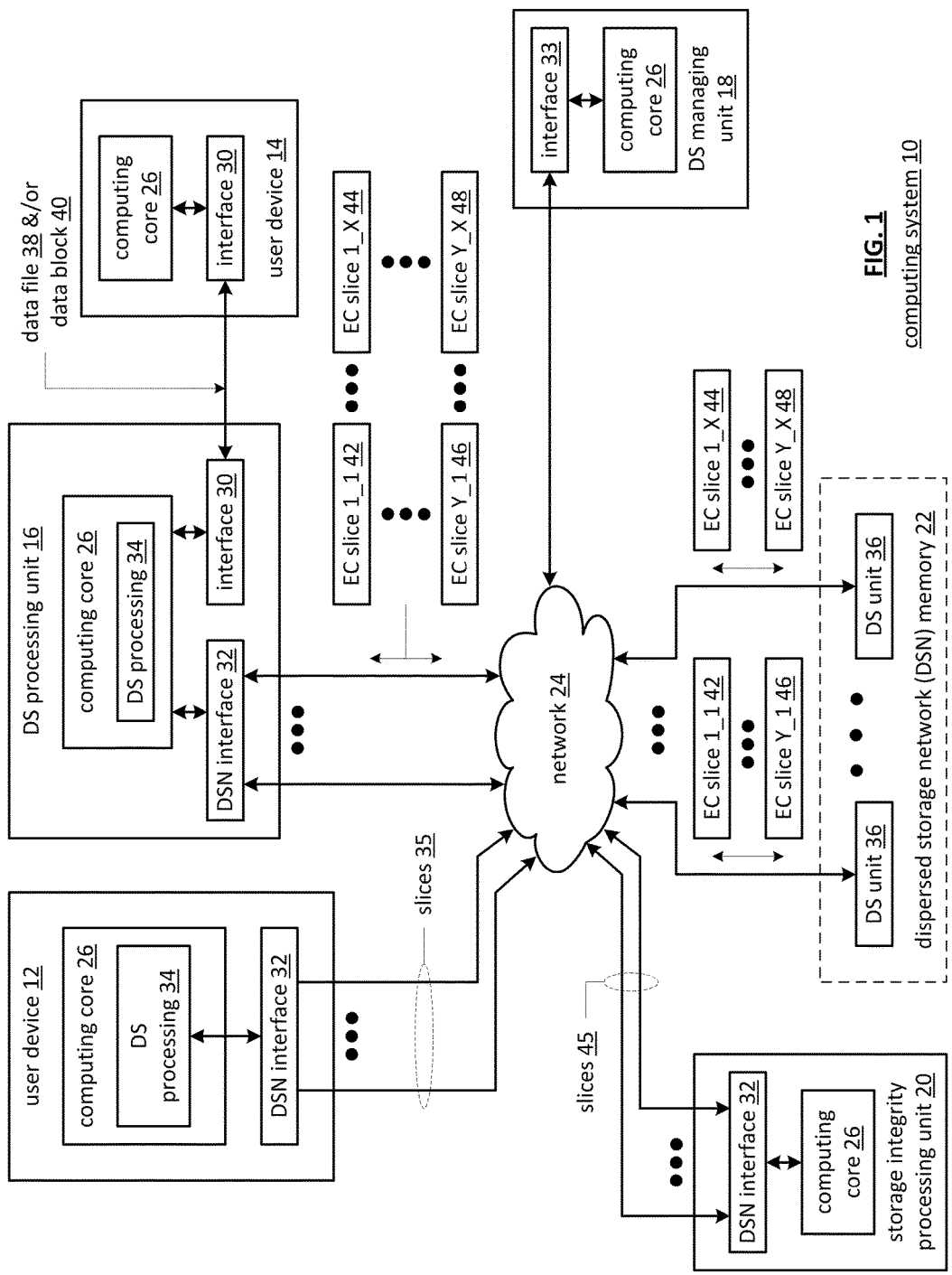
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-28.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-28.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 35 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
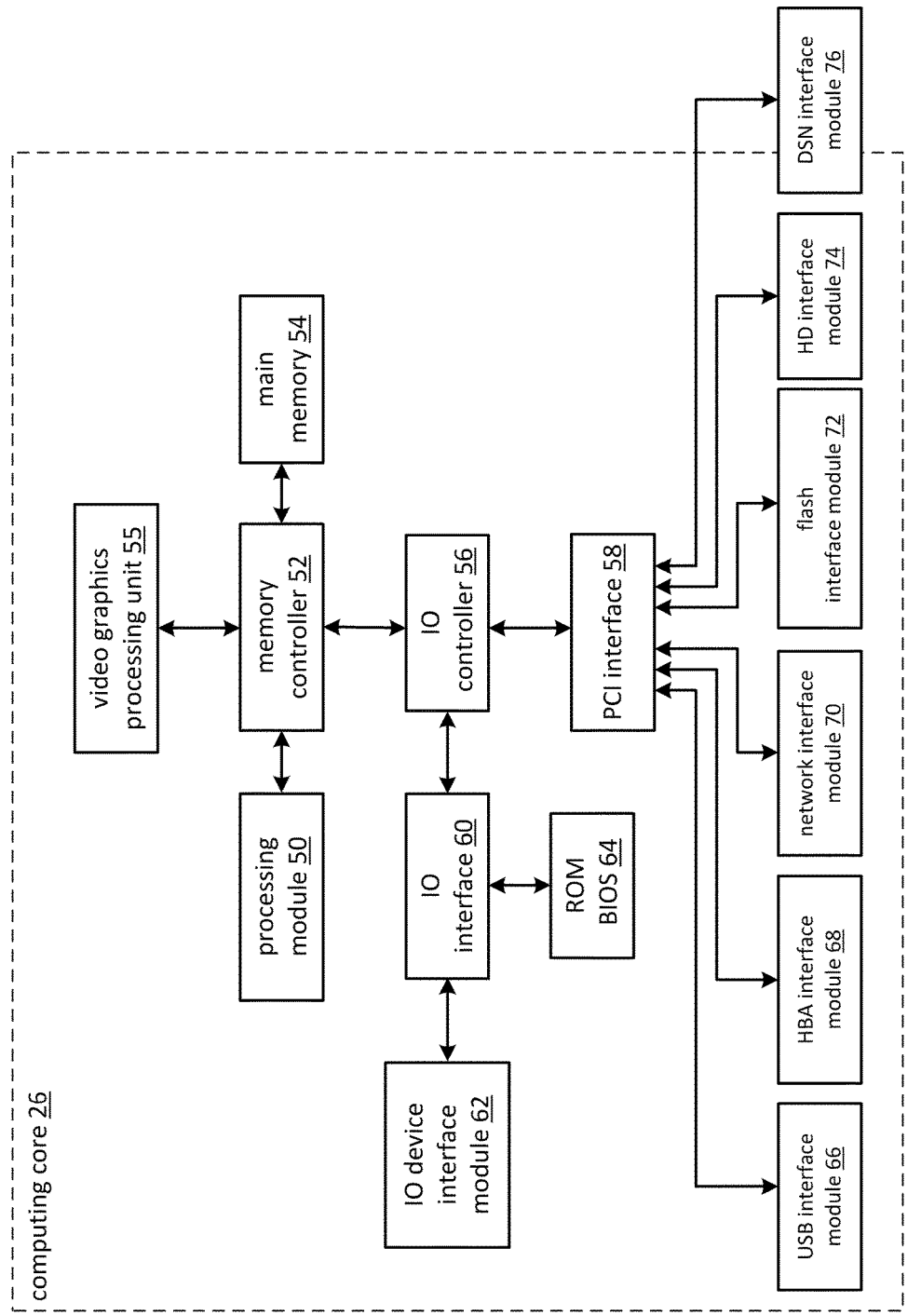
FIG. 2 is a schematic block diagram of an embodiment of a dispersed storage processing unit in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-28.

Figure 3:
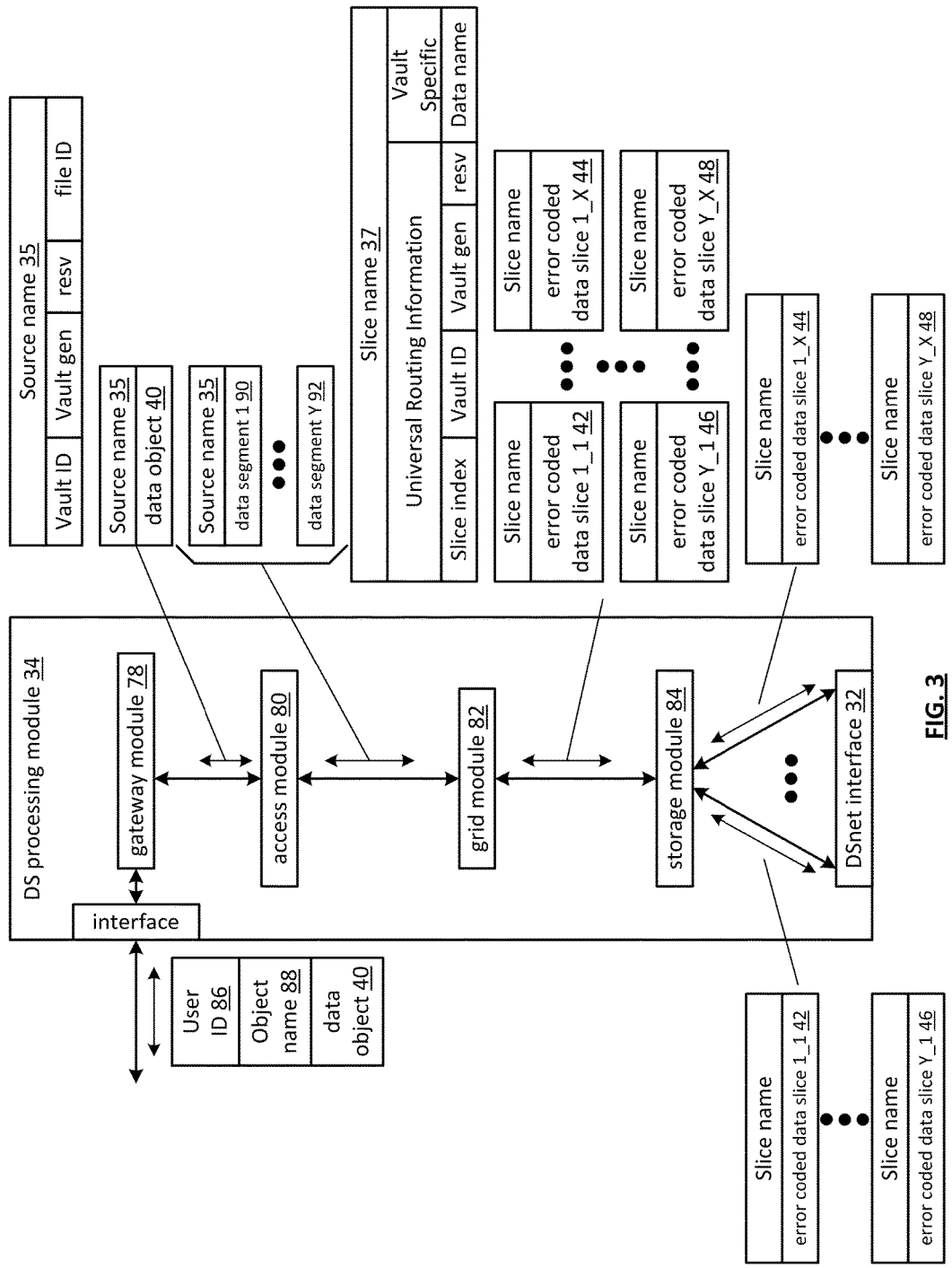
FIG. 3 is a schematic block diagram of an embodiment of a grid module in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. In an embodiment, the gateway module 78, the access module 80, the grid module 82, and the storage module 84 are all implemented in the DS processing module 34 of the user device 12 or are all implemented in the DS processing module 34 of the DS processing unit 16. In another embodiment, the gateway module 78 and the access module 80 are implemented in the DS processing module 34 of user device 12 while the grid module 82 and the storage module 84 are implemented in the DS processing module 34 of the DS processing unit 16.

The gateway module 78 may function to perform one or more of but not limited to message conversion, protocol conversion, electrical conversion, optical conversion, access control, user identification, user information retrieval, traffic monitoring, statistics generation, configuration, management, and/or source name determination. In an embodiment, the gateway module 78 communicates data (e.g., a data object, a data file, a data block, an EC data slice, etc.) and corresponding information with the user device 12-14. The corresponding information may include one or more of but not limited to a process identifier (e.g., an internal process/application ID), metadata, a file system directory, a block number, a transaction message, a user device identity (ID), a data object identifier, a source name, and/or user information. In another embodiment, the gateway module 78 communicates the data and the corresponding information with an internal process to the user device 12 when the gateway module 78 and the access module 80 are implemented in the DS processing module 34 of the user device 12 and the grid module 82 and the storage module 84 are implemented in the DS processing module 34 of the DS processing unit 16.

In an example of storing data, the gateway module 78 receives an incoming data object that includes a user ID field 86, an object name field 88, and the data field 40. The gateway module 78 authenticates the user associated with the data object by verifying the user ID 86 with the DS managing unit 18 and/or another authenticating unit. When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 may segment outbound data of the data into one or more outbound data segments in accordance with a data storage protocol. The data storage protocol may include one or more of but not limited to a file storage system, a block storage system, and/or an aggregated block storage system. For example, the access module 80 receives the data object 40 and creates a series of data segments 1 through Y 90-92 in accordance with a data storage protocol (e.g., file storage system, a block storage system, and/or an aggregated block storage sytem). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

In an embodiment, the grid module 82 may encode an outbound data segment of the one or more outbound data segments into a plurality of outbound encoded data slices in accordance with an error coding dispersal storage function (e.g., compression, encryption, encoding, integrity function). The grid module 82 may pre-manipulate (e.g., compression, encryption, cyclic redundancy check (CRC), etc.) each of the data segments before performing an error coding function of the error coding dispersal storage function to produce a pre-manipulated data segment. The grid module 82 then error encodes (e.g., Reed-Solomon, Convolution encoding, Trellis encoding, etc.) the data segment or pre-manipulated data segment into X error coded data slices 42-44. The grid module 82 generates a plurality of slice names 37 corresponding to the plurality of outbound encoded data slices in accordance with the error coding dispersal storage function and attaches the unique slice name to each data slice. The error coding dispersal storage function is discussed in greater detail with reference to FIG. 4.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

In an embodiment, the slice name 37 includes a universal routing information field and a vault specific field. In an embodiment, the slice name 37 may be 48 bytes in length where the universal routing information field is 24 bytes in length and the vault specific field is 24 bytes in length. As illustrated, the universal routing information field may contain a slice index, the vault ID, the vault generation, and the reserved field. The grid module may generate the slice index is based on the pillar number and the vault ID. As such, the slice index is unique for each pillar (e.g., slices of the same pillar for the same vault for any segment will share the same slice index).

The vault specific field may contain a data name where the data name includes the file ID and a segment number (e.g., a sequential numbering of data segments 1-Y of a simple data object or a data block number). The data name field may be the same for slice names of data slices of the same data segment and may vary for slice names of different data segments. The file ID portion of the data name may not vary for any slice name of the same data object when the file ID is based on a hash function of the data object. Note that the DS processing unit may modify the data name field such that the file ID is not transparent (e.g., produce a data name from a hash of the source name to disguise the file ID).

The grid module may perform post-slice manipulation on the error coded data slices where the manipulation may include one or more of slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an embodiment, the DS processing module 34 may retrieve data slices from the DSN memory to produce data. The storage module 84 receives a plurality of inbound encoded data slices from the plurality of DS storage units 36 in response to a retrieve slice transaction message. The grid module 84 decodes the plurality of inbound encoded data slices into an inbound data segment of one or more inbound data segments in accordance with an error coding dispersal storage function. The access module 80 aggregates one or more inbound data segments into inbound data of the data in accordance with a data storage protocol. The gateway module 78 communicates data and corresponding information with the user device 12-14.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

The grid module 82 may provide an error coding dispersal storage function to encode and slice data to produce data slices as described below. The pre-slice manipulator 75 may provide a pre-slice data manipulation function in accordance with operational parameters of the pre-slice data manipulation function including at least one of a compression parameter, an integrity check method, a caching setting, an encryption parameter, and a parallelism setting. In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 may provide an encoding function in accordance with operational parameters of the encoding function including at least one of a pillar width, a read threshold, a write threshold, a caching setting, and a parallelism setting. For example, the encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 may provide a slicing function in accordance with operational parameters of the slicing function including at least one of a pillar width, a caching setting, a slicing parameter, and a parallelism setting. For example, the slicer 79 transforms the encoded data segment 94 into EC data slices in accordance with the slicing parameter from the vault for this user and/or data segment 92. For example, if the slicing parameter is X=16, then the slicer slices each encoded data segment 94 into 16 encoded slices.

The post-slice manipulator 81 may provide a post-slice data manipulation function in accordance with operational parameters of the post-slice data manipulation function including at least one of a compression parameter, an integrity check method, a caching setting, an encryption parameter, and a parallelism setting. For example, the post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

The grid module 82 may provide an error coding dispersal storage function to retrieve data slices to produce data as described below. The post-slice de-manipulator 89 may provide a post-slice data de-manipulation function in accordance with operational parameters of the post-slice data de-manipulation function including at least one of a compression parameter, an integrity check method, a caching setting, an encryption parameter, and/or a parallelism setting. For example, the post-slice de-manipulator 89 they receive a plurality of data slices from the storage module and perform an integrity check. The post-slice de-manipulator 89 may forward the plurality of data slices to the de-slicer 87 when the post-slice de-manipulator 89 determines that the plurality of data slices passes the integrity check. The de-slicer 87 may provide a de-slicing function in accordance with operational parameters of the de-slicing function including at least one of a pillar width, a caching setting, a slicing parameter, and/or a parallelism setting. For example, the de-slicer 87 may aggregate data slices from the plurality of data slices to produce a de-sliced encoded data segment. The decoder 85 may provide a decoding function in accordance with operational parameters of the decoding function including at least one of a pillar width, a read threshold, a write threshold, a caching setting, and/or a parallelism setting. For example, the decoder 85 may decode the de-sliced encoded data segment utilizing an error decoding algorithm to produce a decoded data segment. The pre-slice de-manipulator 83 may provide a pre-slice data de-manipulation function in accordance with operational parameters of the pre-slice data de-manipulation function including at least one of a compression parameter, an integrity check method, a caching setting, an encryption parameter, and/or a parallelism setting. For example, the pre-slice de-manipulator 83 may decrypt the decoded data segment to produce a decrypted data segment when the pre-slice de-manipulator 83 is to decrypt in accordance with the encryption parameter.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment.

FIG. 5 is a diagram of an example of slicing an encoded data segment 94 by the slicer 79. In this example, the encoded data segment includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
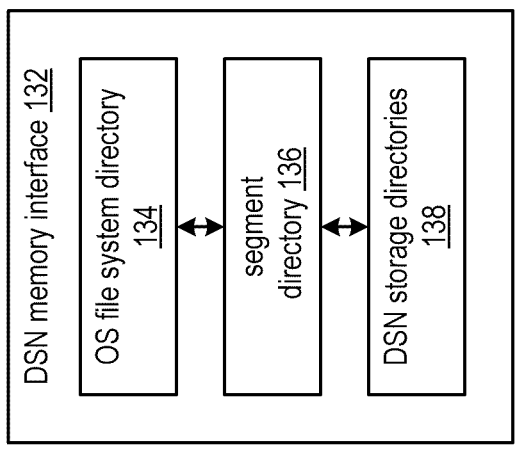
FIG. 6 is a schematic block diagram of an embodiment of a dispersed storage network memory interface in accordance with the invention.

FIG. 6 is a schematic block diagram of an embodiment of a dispersed storage network (DSN) memory interface 132 for a second user device that can access the DSN memory in a native fashion. The block diagram depicts linkage of directories. The DSN memory interface may include an OS file system directory 134 linked to a segment directory 136 linked to DSN storage directories 138.

The OS file system 134 directory points file names directly to DS data segment names. The segment directory 136 may be indexed utilizing the DS data segment names to determine virtual dispersed storage network (DSN) address names. The DSN storage directories 138 may be indexed by the virtual DSN address names to determine physical dispersed storage network (DSN) storage unit identifiers.

Figure 7:
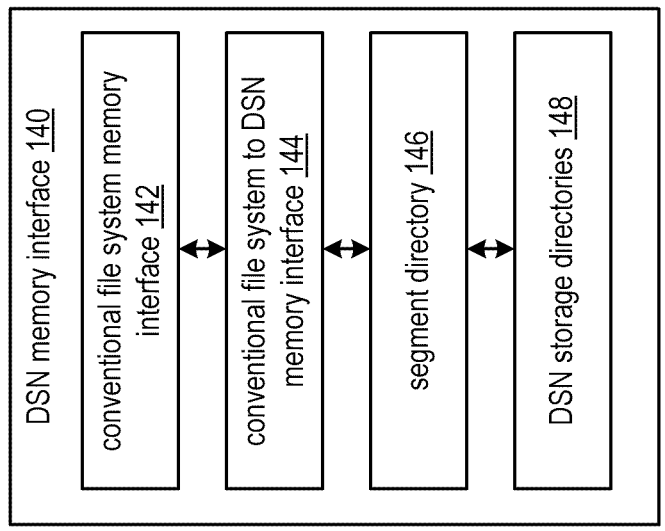
FIG. 7 is a schematic block diagram of another embodiment of a dispersed storage network memory interface in accordance with the invention.

FIG. 7 is a schematic block diagram of another embodiment of a dispersed storage network (DSN) memory interface 140 for a first user device that will access the DSN memory utilizing a legacy OS file system of the first user device. The block diagram depicts linkage of directories. The DSN memory interface 140 may include a conventional file system memory interface 142 (e.g., NFS, DFS, FFS, etc.) coupled to a conventional file system to DSN memory interface 144 coupled to the segment directory 146 linked to DSN storage directories 148.

The legacy OS file system directory points to file names compatible with the OS file management system. The OS file system interfaces to the DSN through the conventional file system to DSN memory interface 144. The conventional file system to DSN memory interface 144 converts the OS file system format to DS data segment names. The conversion will be discussed in greater detail with reference to FIGS. 10-14. The segment directory 146 may be indexed utilizing the DS data segment names to lookup virtual dispersed storage network (DSN) address names. The DSN storage directories 148 may be indexed by the virtual DSN address names to lookup physical dispersed storage network (DSN) storage unit identifiers.

Figure 8:
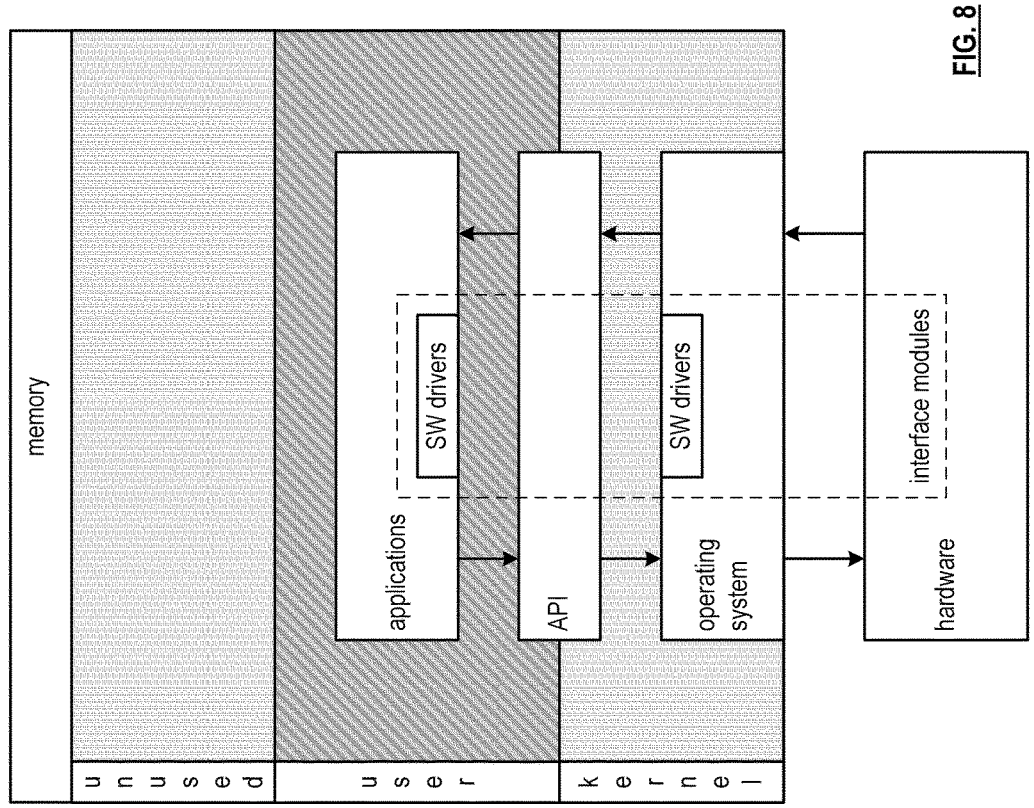
FIG. 8 is a schematic block diagram of an embodiment of a memory mapping in accordance with the invention.

FIG. 8 is a schematic block diagram of an embodiment of a memory mapping of major blocks of memory including a kernel block, a user block, and an unused block. The blocks may be associated with physical memory addresses or the blocks may be associated with virtual memory where the physical memory may be fragmented within a first memory type or overflow to a second memory type (e.g., a disk drive). The kernel block is an area of memory exclusive to the operating system (OS). The user block is typically utilized by applications both for application instructions and application data. The unused block is spare memory in an instantaneous sense as it may be utilized for future expansion of more applications and for other uses on a temporary basis (e.g., data caching).

It is typical to associate the hardware and software to the memory mapping utilizing layers. A hardware layer may include integrated circuits that communicate, process, and store data. The hardware layer is the underpinning of the memory and what executes the software instructions. Interface modules associated the hardware layer provide the electrical connections to facilitate communications between the various elements of the hardware layer.

An OS layer has many critical functions, including managing activities and sharing of resources. As such, the OS may exclusively utilize the kernel memory block. File management is one of the sharing of resources functions of the OS. The OS is a host to the applications that execute on the hardware. Examples of the OS layer includes Mac OS X, OS X iPhone, BlackBerry OS, Symbian OS, Palm webOs, Android, Linux, LynxOS, versatile real-time executive (VRTX), Unix, interworking operating system (IOS) XR, SunOS, Windows Mobile, Windows XP, Windows Vista, and Windows 7. Software (SW) drivers accommodate the particulars of the hardware for the applications through an application programming interface (API) layer. The API layer utilizes software associated with one or both of the application and the OS. The API layer may utilize one or both of the kernel and user memory blocks.

An applications layer overlays on the user memory block and contains application software and variables created by the applications. Examples of applications includes word processing, drawing tools, media manipulations, multimedia communications, file backups, and many more software packages that communicate, manipulate, and store data. Software drivers with the applications facilitate communicates with the other layers such as the OS through the API.

Figure 9:
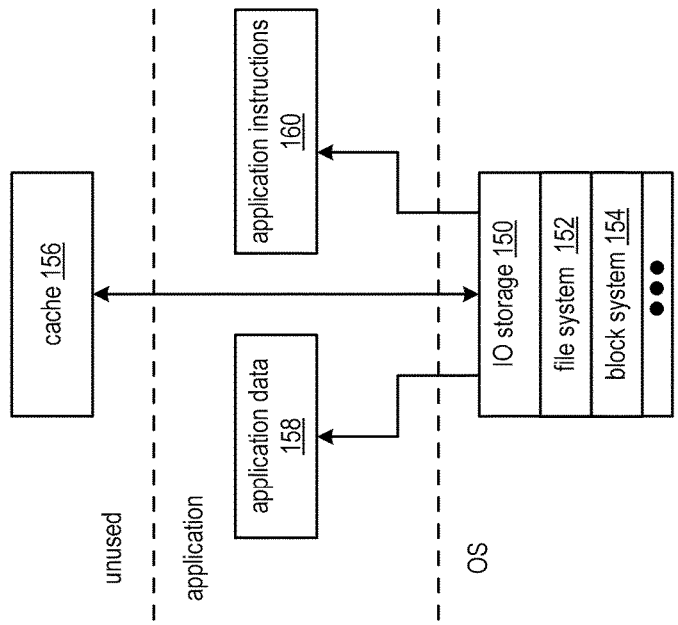
FIG. 9 is a schematic block diagram of another embodiment of a memory mapping in accordance with the invention.

FIG. 9 is a schematic block diagram of another embodiment of a memory mapping where an IO storage 150 element of the OS layer interfaces with the application data 158 and application instructions 160 of the application layer, and with a cache memory 156 in the unused memory block. For example, application data 158, such as a word processing file, may be retrieved from IO storage 150 and presented to the application for further processing. In another example, the executable application instructions 160 may be transferred from the IO storage 150 to the application for execution of a word processing application.

The cache memory 156 may be a temporary assignment of unused memory to store data when the data is being transferred to or from the IO storage. For example, the OS may utilize the cache 156 when translating the data being retrieved from one format to another. In another example, the cache 156 may be used to store flags from memory access requests from any of the applications accessing memory through the IO storage.

The IO storage layer within the OS may interface with a hierarchical memory system where a file system layer 152 interfaces with a block system 154 to break down the files into pieces that can be more readily stored on physical storage medium. The hierarchy of the file systems will be described in greater detail with reference to FIGS. 10-23.

Figure 10:
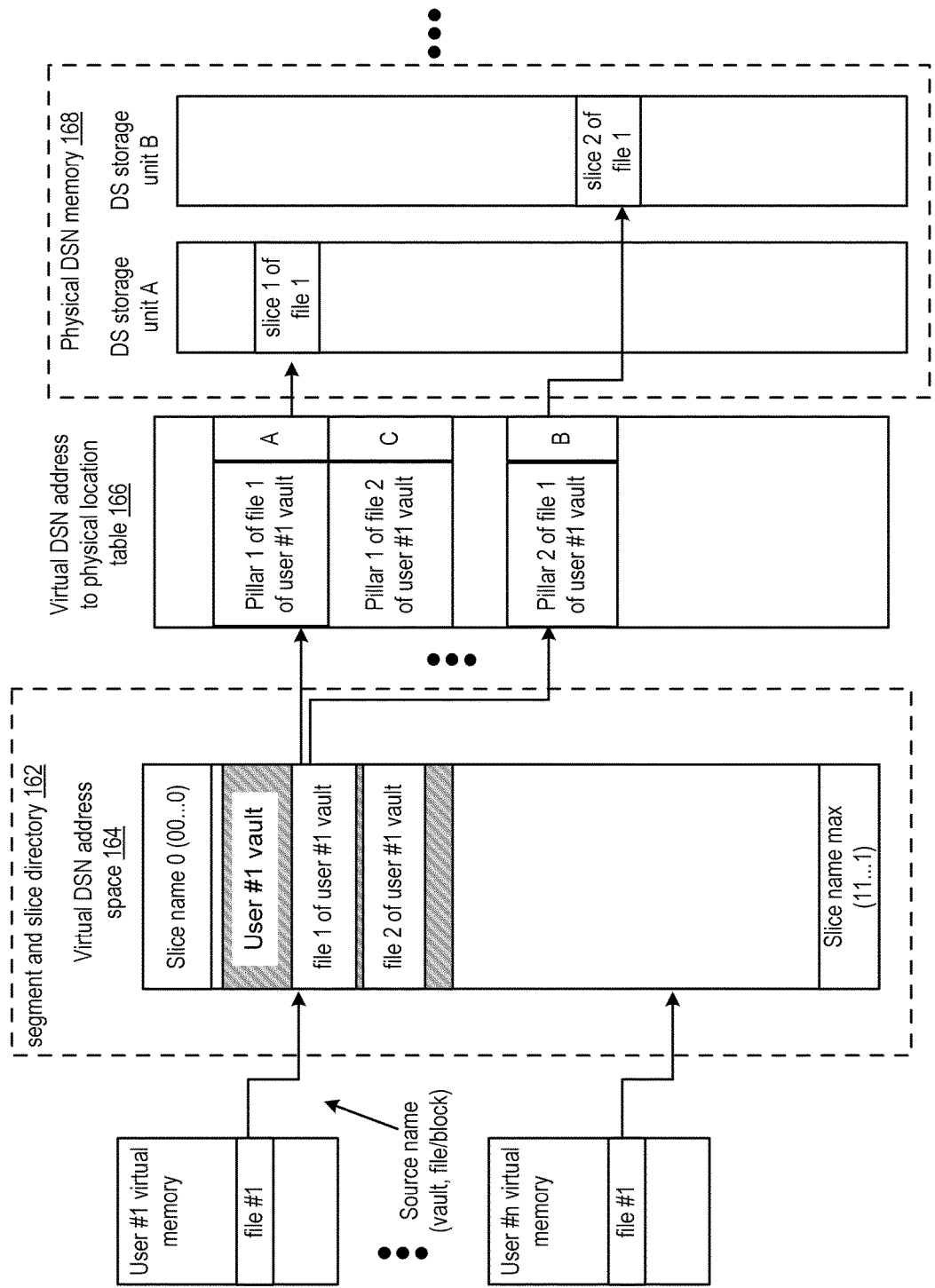
FIG. 10 is a schematic block diagram of an embodiment of a file system hierarchy in accordance with the invention.

FIG. 10 is a schematic block diagram of an embodiment of a file system hierarchy including a plurality of user virtual memories, a segment and slice directory 162, a virtual dispersed storage network (DSN) address to physical location table 166, and a physical dispersed storage network (DSN) memory 168. The file system hierarchy may be utilized to translate the user virtual memory system to the physical DSN memory 168 by translating the user virtual memory address into a virtual dispersed storage network (DSN) address space 164 and then to the physical DSN memory 168. The segment and slice directory 162 comprises the virtual DSN address space 164 and the physical DSN memory 168 includes a plurality of DS storage units.

In an embodiment, one of the plurality of user virtual memories utilizes a native OS file system to access the segment and slice directory 162 by including source name information in any request such as read, write, delete, list, etc. The source name vault identifier and file/block name will index into the segment and slice directory 162 to determine the virtual DSN address space 164. In an example embodiment, the total virtual DSN address space 164 is defined by a forty eight byte identifier thus creating over 281 trillion possible slice names. The virtual DSN address space 164 accommodates addressing all EC data slices of every segment of every data object (e.g., data file, blocks, streams) of every generation, of every user vault. The slice name is a virtual DSN address and remains the same even as different DS storage units are added or deleted from the physical DSN memory 168.

A user has a range of virtual DSN addresses assigned to their vault. In one embodiment, the virtual DSN addresses typically do not change over the operational lifespan of the system for that particular user. In another embodiment, the virtual DSN address space 164 is dynamically altered from time to time to provide a potential benefits including improved security and expansion, or retraction, capability. A virtual DSN address space 164 security algorithm may alter the virtual DSN address space 164 according to one or more of a command (e.g., from the DS managing unit), a schedule, a detected security breach, or any other trigger. The virtual DSN address may also be encrypted in use thus requiring encryption and decryption steps whenever the virtual DSN address is used.

The index into the virtual DSN address space 164 by vault and file name will create the slice names (virtual DSN addresses) to use as an index into the virtual DSN address to physical location table 166. In an embodiment, the virtual DSN address to physical location table 166 is sorted by vaults and pillars so that the subsequent addresses are organized by pillar of all the file segments that have EC data slices with the same slice identifier and hence are typically stored at the same DS storage unit. The output of the access to the virtual DSN address to physical location table 166 is the DS storage unit identifiers.

The slice names will be used as the virtual index to the memory system of each DS storage unit to gain access the physical address of the EC data slices. In an embodiment, the DS storage unit maintains a local table correlating slice names (virtual DSN address) to the addresses of the physical media internal to the DS storage unit.

FIG. 11 is a diagram of an embodiment of a dispersed storage (DS) memory mapping X number of vertical pillar columns (the same slice number EC data slice are stored in a given pillar), and Y rows are formed by the data segment numbers. An intersection of a particular row and column reference a particular EC data slice of a particular data segment and an entry of that intersection indicates which virtual DS storage unit will contain that EC data slice by way of a virtual dispersed storage network (DSN) address. The segment number specifies a row address into the memory mapping. Typical values for X (slices per segment) may be 4, 6, 8, 16, 24, and 32. Typical values for Y (data segments per data object) can be in the tens of thousands, hundreds of thousands, millions, or more. The XY entries equal the total number of EC data slices stored for one data object. The DS memory mapping is a visualization of part of the configuration parameter information in the vault.

The number of DS storage units may be unlimited, but it should be greater than or equal to the number of EC data slices X so that just one slice from a given data segment is stored on any one DS storage unit. Losing two slices as a result of one DS storage unit failure is generally not desired.

In an example of operation, data segment 1 is to be retrieved by referencing the DS storage memory mapping to determine what the virtual DSN address is for the EC data slices. In the example diagram, EC data slice 1 has a virtual DSN address of θ' 1_45 and is associated with virtual DS storage unit A, and EC data slice 2 has a virtual DSN address of θ' 2_45 and is at virtual DS storage unit B.

The same DS storage memory mapping is used for a given data object to indicate where EC data slices are stored. A different DS storage memory mapping may be used for each data object. In an embodiment, a static DS storage memory mapping is used for all of the data objects. In another embodiment, a dynamic DS storage memory mapping is used where the mapping is a function of one or more of the type of data object, availability, self-selection, performance history, link speed, link latency, ownership, available memory, domain, cost, and more generally on one or more of a prioritization scheme, a centralized selection message from another source, a lookup table, who owns the data, and/or any other factor to optimize the operation of the computing system.

Figure 12:
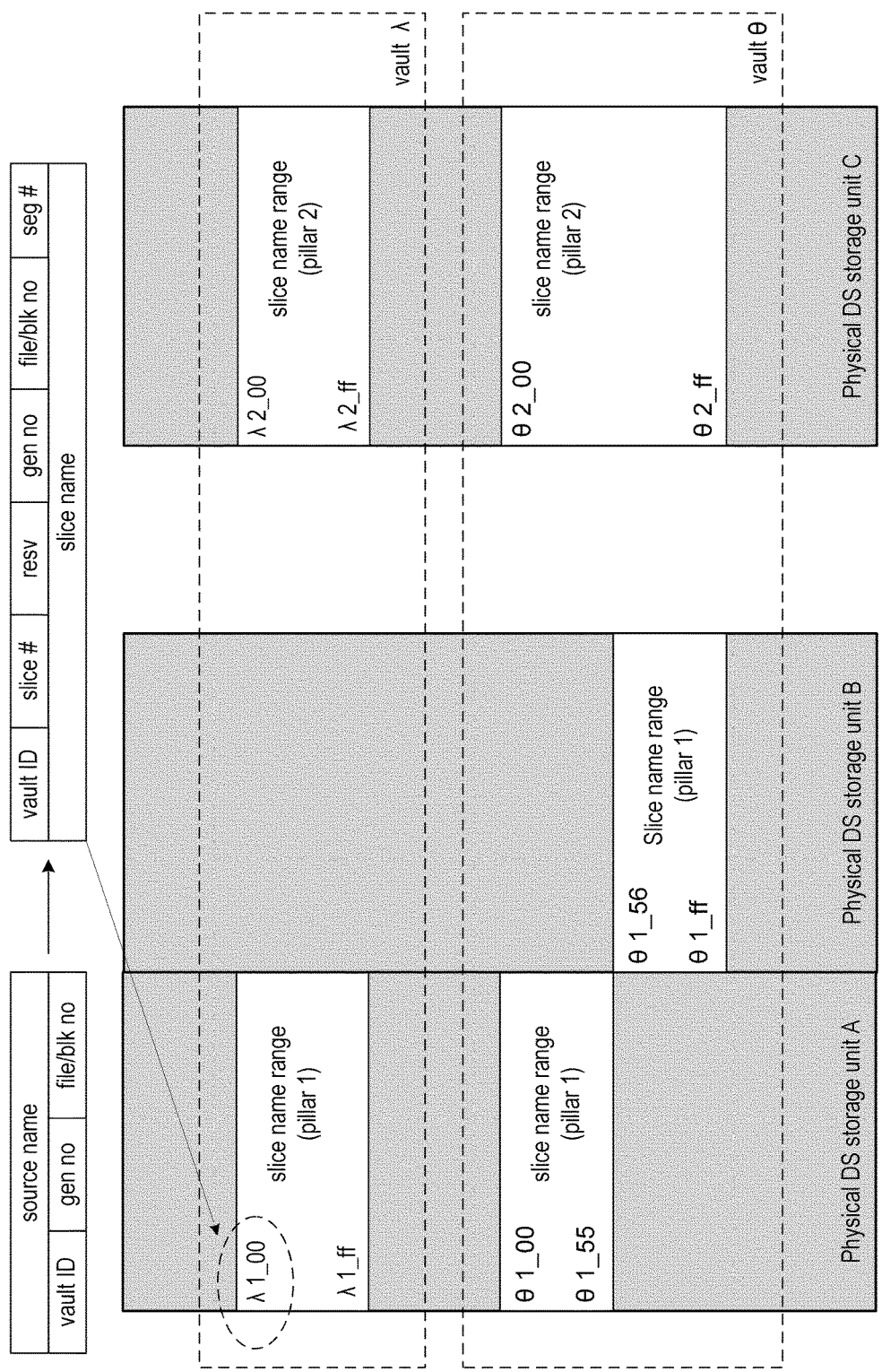
FIG. 12 is a diagram of another embodiment of a dispersed storage memory mapping in accordance with the invention.

FIG. 12 is a diagram of another embodiment of a dispersed storage memory mapping including slice name ranges, for particular vaults that have the same slice identifiers, are mapped to DS storage unit identifiers. The range has a common vault number and common slice identifier hence that range is consistent with a single pillar. To provide desired error resiliency the same pillar may utilize one or more DS storage units but at most one pillar (of a given vault) will utilize the same DS storage unit. In other words, pillars of the same vault utilize different DS storage units. In an example, pillar 1 of vault λ, utilizes DS storage unit A and pillar 2 of vault λ utilizes DS storage unit C. In another example, pillar 1 of vault θ utilizes DS storage units A and B while pillar 2 of vault θ utilizes DS storage unit C.

The slice name range is derived from the source name and includes the other elements of the slice name once the vault identifier and slice identifier is specified. The other elements include reserved bits (flag space and bits for future uses), the generation number, the file name/block identifier, and the segment number. Slice name address numbers on the boundaries of a split between two or more DS storage units may be random or chosen to meet a split criteria. For example, the split criteria may force the boundaries to be between file numbers, segment numbers of the same file number, generations of the same file, or other (e.g., reserved bits, flags, future expansion).

In an example, the slice name field comprises forty-eight bytes including sixteen bytes for the vault identifier, two bytes for the slice identifier, eight bytes for the reserved field, two bytes for the generation number, 16 bytes for the file/block number, and four bytes for the segment number. The thirty bytes of the other elements specifies over a trillion addresses of EC data slices for the given vault and slice identifier. In one embodiment, slice names for pillars are specified in ranges rather than byte by byte with such a great magnitude of possible addresses. The slice name ranges may be broken up into any number of ranges where the number of ranges is less than the number of permutations of the address space of the other elements (e.g., a trillion).

Figure 13:
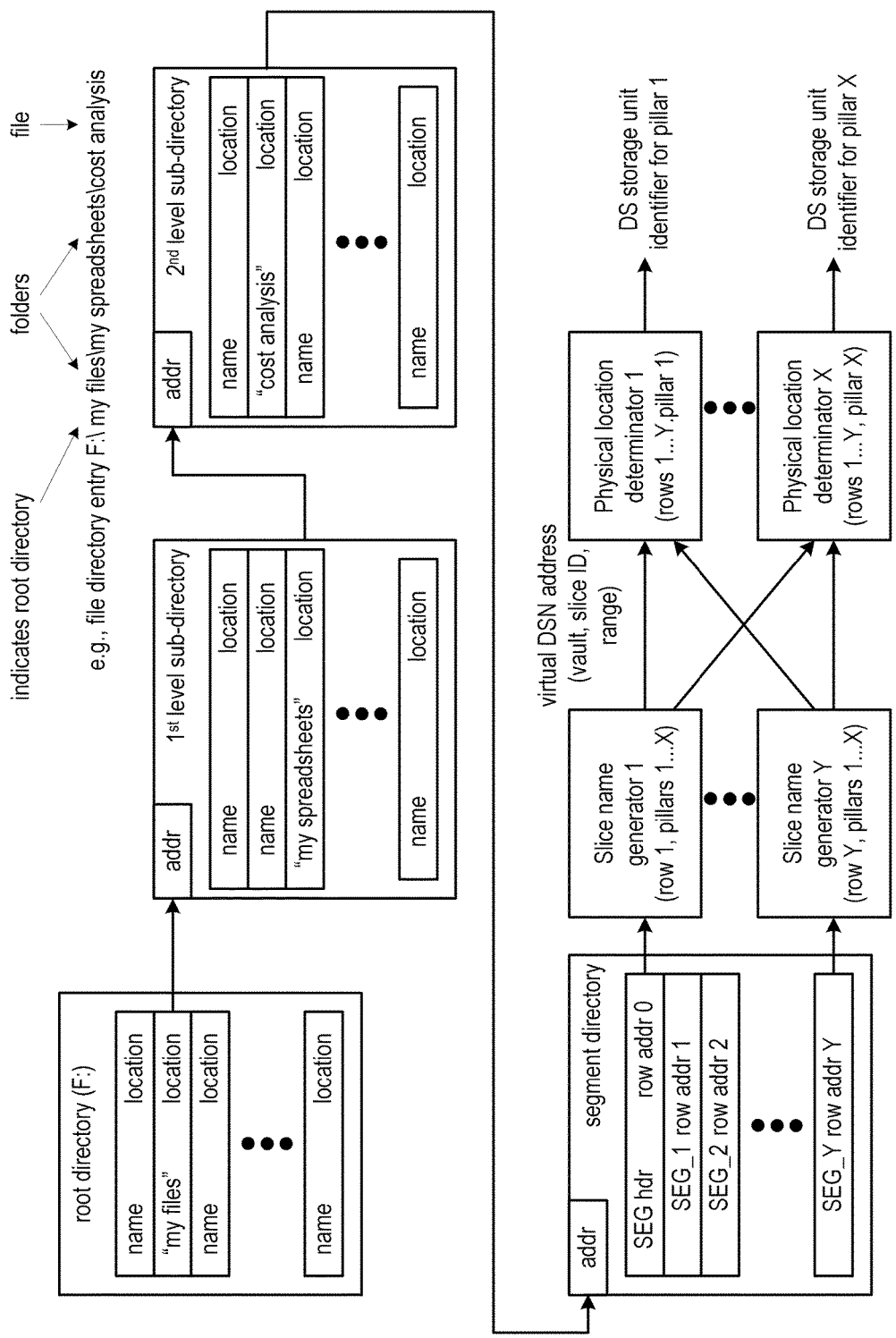
FIG. 13 is a schematic block diagram of another embodiment of a dispersed storage network memory interface in accordance with the invention.

FIG. 13 is a schematic block diagram of another embodiment of a dispersed storage network memory interface that includes a file system hierarchy of a root directory, a $1^{st}$ level sub-directory, a $2^{nd}$ level sub-directory, a segment directory, a plurality of slice name generators 1 through Y, and a plurality of physical location determinators 1 through X to create DSN storage unit identifiers. The root directory, $1^{st}$ level sub-directory, and $2^{nd}$ level sub-directory form the OS file system directory to link the root to a file/block location. Based on the file location index into the segment directory, the DSN storage unit identifier can be determined. The file system directories may be stored in the OS kernel memory space or the user memory space and may further be stored in any type of physical memory including local main memory, disk drive, or in the dispersed storage network.

The root directory is indexed with names of $1^{st}$ level sub-directories (or file names) to determine the address of each $1^{st}$ level sub-directory. The root directory typically starts at a pre-determined location in memory.

The $1^{st}$ level sub-directory is located from the address pointer in the root directory and is indexed with names of $2^{nd}$ level sub-directories (or file names) to determine the address of each $2^{nd}$ level sub-directory.

The $2^{nd}$ level sub-directory is located from the address pointer in the $1^{st}$ level sub-directory and is indexed with names of file names (or further levels of sub-directories) to determine the address of each file/block (or further levels of sub-directories).

In an example, the file hierarchy "F:\my files\my spreadsheet\cost analysis" is a path name and points to an address that contains the segment directory (list) of segments and their segment row addresses. The segment row address specifies the common segment number for all slice numbers of that segment.

In an alternative embodiment, the segment row addresses are determined based on the source name derived from the user information and file/block number. The source name contains the vault identifier. The vault identifier points to the vault where the user operational parameters are stored include width X and segment size. The number of segments Y is calculated by dividing the file size by the segment size. The row addresses are deduced by setting the slice identifier to 1 and populating the slice name fields with the vault identifier, the reserved bits in accordance with the vault, the generation number in accordance with the vault or user provided information, the file/block number and varying the segment numbers from 1 to Y.

The plurality of slice name generators deduced the rest of the slice name addresses to create the complete virtual DSN address. The slice identifier fields are varied from 1 to X.

The plurality of physical location determinators 1 through X utilize the full slice names for all segments by pillar to determine the DSN storage unit identifiers for each pillar 1 through X. The determination is accomplished by using the slice name as an index into a table of ranges as previously described in FIG. 12 to determine the DS storage unit identifiers for the ranges of slices names by sorting by vault and pillar numbers. The determination process will be discussed in greater detail with reference to FIG. 14.

Figure 14:
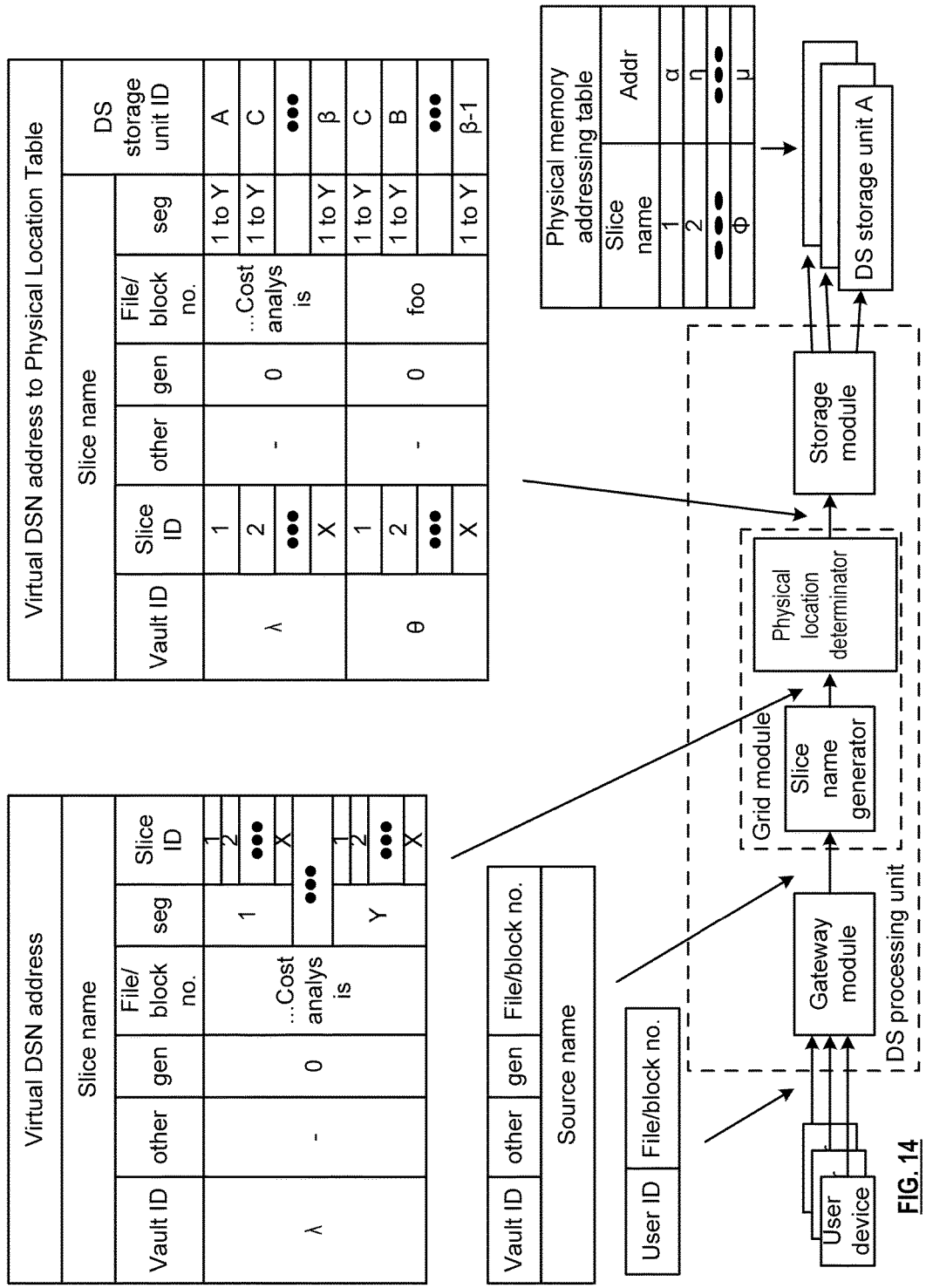
FIG. 14 is a block diagram of an example of a dispersed storage network addressing protocol in accordance with the invention.

FIG. 14 is a block diagram of an example of a dispersed storage network addressing protocol including a plurality of user devices, the DS processing unit, and a plurality of DS storage units. The DS processing unit may include the gateway module, the grid module, and the storage module. The grid module may include the slice name generator and the physical location determinator. In another embodiment, the slice name generator and the physical location determinator may be included in any portion or module of the DS processing unit.

In an embodiment, the user devices accesses the DS storage units by sending the gateway module a message utilizing a native OS file system addressing scheme which may include the user identifier and the file/block number. The gateway module authenticates the user and looks up the vault identifier for this user. The look up may access a vault table stored in the DS processing unit, the DS managing unit, the DS storage unit. The gateway module may create the source name including the vault identifier, another field reserved for future expansion and flags, the generation number, and the file/block number.

The slice name generator receives the source name and may determine the full range of virtual DSN addresses (slice names) by populating the slice name fields with information from the source name including the vault identifier, other, the generation, the file/block number and with the valid segment range for the file/block and valid slice identifier range for each segment. The slice name generator retrieves the valid range of slice identifiers 1 through X from the vault for this user. The slice name generator determines the number of segments by dividing the file size by the segment size retrieved from the vault for this user. The slice name generator passes the ranges of slice names for this file/block to the physical location determinator.

The physical location determinator utilizes the slice name as an index into the virtual DSN address to physical location table to determine the DS storage unit identifier for each pillar (same slice identifier) by sorting by vault identifier and slice identifier. For example, vault λ slice identifier 1 has EC data slices for slice 1 data segments 1 through Y stored at DS storage unit A. In an embodiment, all the segments 1 through Y for a given pillar 1 are stored on the same DS storage unit since the range boundaries may cleanly land on segment number and/or file/block number boundaries. In another embodiment, the boundaries may occur anywhere such that not all of the segments for the same pillar of a given file may be stored on the same DS storage unit.

Different vaults may share the same DS storage units. For example, vault λ pillar identifier 2 has EC data slices for slice 2 data segments 1 through Y stored at DS storage unit C while vault θ pillar identifier 1 has EC data slices for slice 1 data segments 1 through Y stored at DS storage unit C as well.

The physical location determinator will pass the DS storage unit identifiers for each range of slice names to the storage unit so it can access the physical DS storage units by sending the request message with the slice names. The DS storage unit determines the physical media address utilizing a physical memory addressing table by indexing with the slice name. In an embodiment, the physical memory addressing table resides on the given DS storage unit. In another embodiment, the physical memory addressing table resides in one or more of the DS processing unit, the DS managing unit, the user device, another of the plurality of DS storage units, and/or a unit or device external to the computing system.

Figure 15:
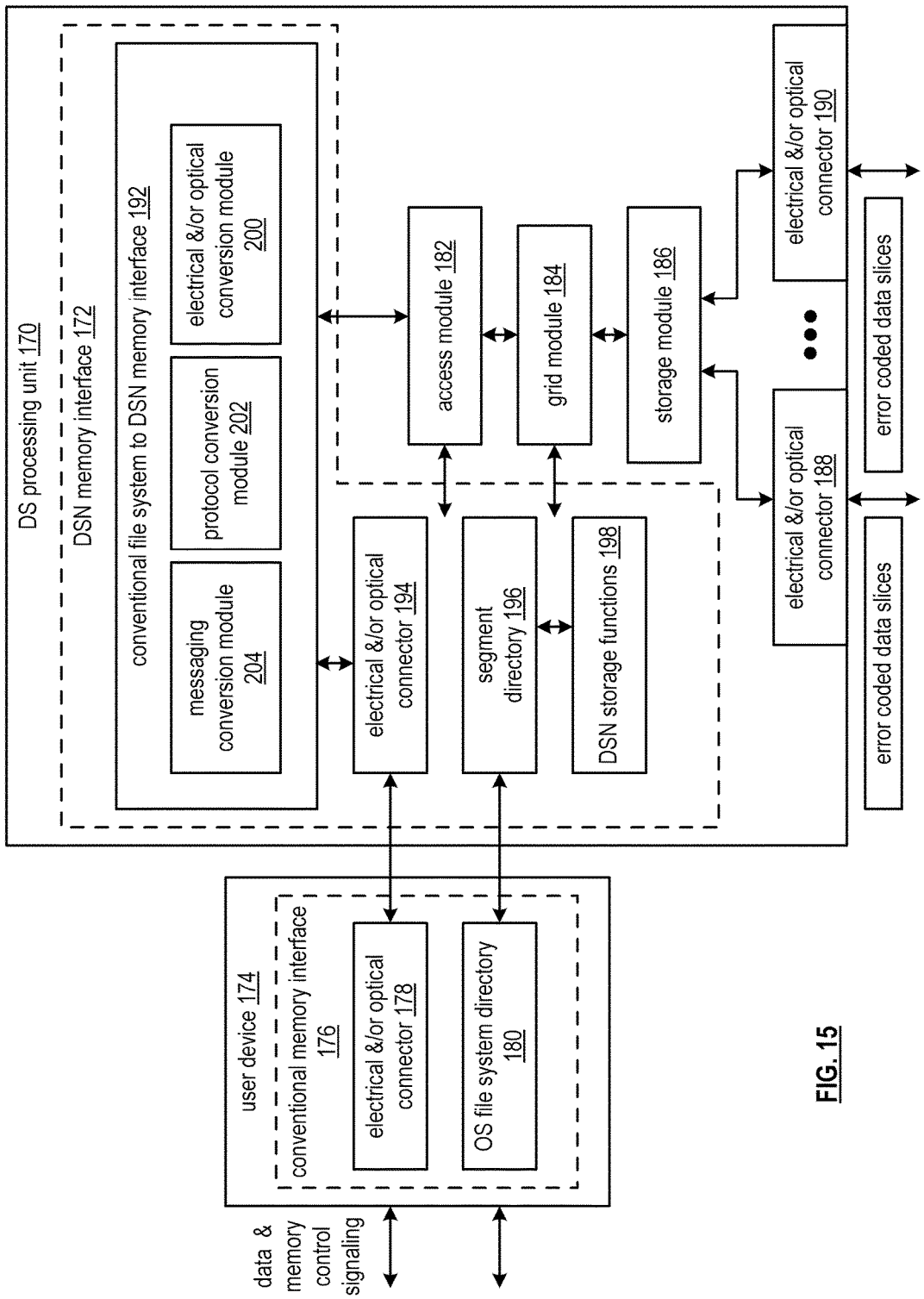
FIG. 15 is a schematic block diagram of another embodiment of a dispersed storage network memory interface in accordance with the invention.

FIG. 15 is a schematic block diagram of another embodiment of a dispersed storage network memory interface 172 including the physical and memory management paths between the user device 174 and the DS processing unit 170. The user device 174 may include the conventional memory interface 176 comprising an electrical and/or optical connector 178 and the OS file system directory 180. The DS processing unit 170 may include the DSN memory interface 172, the access module 182, the grid module 184, the storage module 186, and a plurality of electrical and/or optical connectors 188-190. The DSN memory interface 172 may include the conventional file system to DSN memory interface 192, the electrical and/or optical connector 194, the segment directory 196, and the DSN storage functions 198. The conventional file system to DSN memory interface 192 may include an electrical and/or optical conversion module 200, a protocol conversion module 202, and a messaging conversion module 204.

The electrical and/or optical connector 178, 188, 190, 194 is an electrically conductive or light-wave spectrum conductive device that joins electrical or optical circuits together. Connectivity between two connectors is provided directly (e.g., connector to connector) or via an intermediary electrical or optical signal conductor (e.g., wire or a light fiber). Examples of connectors includes form factors constructed in accordance with a standards including D-subminiature, universal serial bus (USB), 8 position 8 conductors (8P8C), E2000, enterprise systems connector (ESCON), F-3000, ferrule connector (FC), media interface connector (MIC), and mechanical transfer registered jack (MT-RJ).

In another embodiment, the electrical and/or optical connector 178, 194 is replaced or augmented by a wireless transceiver that can communicate wireless signals between devices and units either directly or indirectly through a wireless infrastructure or unit-to-unit wireless hopping method.

The electrical and/or optical connector 178, 188, 190, 194 provides signal connectivity between the user device 174 and the DS processing unit 170, and between the DS processing unit 170 and the DS storage unit (and other units) via the network. The electrical signals convey the messaging and data transfer and may be constructed in accordance with a standard including Recommended Standard 232 (RS-232), RS-422, and IEEE 802.3.

The electrical &/or optical conversion module 200 may provide conversion between electrical signals on the wire or light signals on the fiber and the electrical signals within the DS processing unit 170. The protocol conversion module 202 converts between the electrical signals within the DS processing unit 170 and the protocols that the electrical signals represent. For example, 10 gigabit Ethernet uses internet protocols (IP) over 10 GBASE-T physical connectivity defined in the IEEE 802.3-2008 standards.

The messaging conversion module 204 converts between the protocols (e.g., IP) and the messages used to convey memory management functions. For example, the messaging conversion module 204 may convert iSCSI, NFS, DFS, FFS and or other file system messages from the OS file system of the user device 174 into DSN memory messages used by the DS processing unit 170.

The DSN storage functions may assist the conventional file system to DSN memory interface 192 translate between the conventional memory system of the OS file system and the DSN memory. For example, the DSN storage functions may provide the operational parameters for the user by reading the operational parameter from the vault associated with the user. For example, a read request message from the user may indicate the user identification and file name or block name to be read. The access module 182, grid module 184, and or storage module 186 may forward the user identification information to the DSN storage functions seeking the operational parameters of the DSN for this user.

In an example of operation, the user device 174 signals a request to read a file message using iSCSI over the Ethernet cable between the user device 174 electrical &/or optical connector 178 and the electrical &/or optical connector 194 of the DSN memory interface 192 in the DS processing unit 170. The electrical &/or optical conversion module 200 converts the physical Ethernet signals into internal DSN memory electrical signals that are converted by the protocol conversion module 202 into the IP message. The messaging conversion module 204 converts the iSCSI message from the IP message into the DS memory message indicating the identity of the user device 174, the request, and the data file/block name requested. The access module 182 and grid module 184 determine the virtual DSN address (slice names) and determine the locations of the EC data slices corresponding to the data file/block as previously described. The storage module 186 signals the DS storage units where the EC data slices are stored to retrieve the EC data slices corresponding to the data file/block as previously described. The grid module 184 and access module 182 decode the EC data slices and recreate the data file/block as previously described. The access module 182 provides the data file/block to the conventional file system to DSN memory interface 192 to format the response to the user device 174. The messaging conversion module 204 packs the data file/block into a iSCSI response and passes the response to the protocol conversion module 202 to convert the response into the IP message electrical signals. The IP message electrical signals are converted by the electrical &/or optical conversion module 200 to the electrical or optical signals for transmission through the electrical &/or optical connector 194 to the Ethernet wire. The electrical &/or optical connector 178 of the user device 174 coupled to the Ethernet wire receives the iSCSI message and provides it to the OS file system for further processing.

Figure 16:
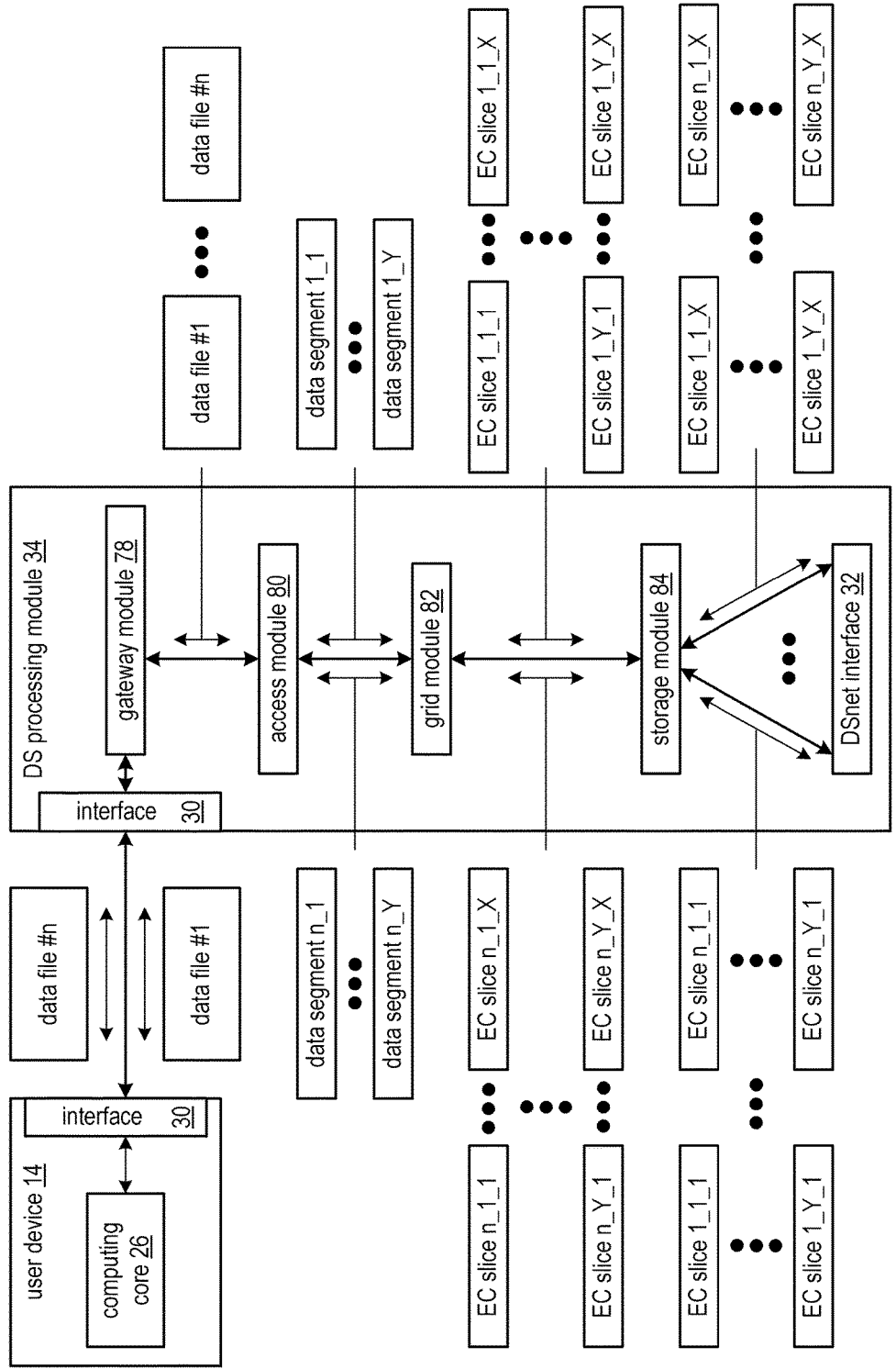
FIG. 16 is a schematic block diagram of another embodiment of a dispersed storage processing unit in accordance with the invention.

FIG. 16 is a schematic block diagram of another embodiment of a dispersed storage processing module 34 that includes the interface 30, the gateway module 78, the access module 80, the grid module 82, the storage module 84, and the DSnet interface 32. The DS processing module 34 functions includes the transformation of incoming data objects (e.g., files, blocks, streams) in parallel from the interface 30 into error coded (EC) data slices which the DS processing module 34 stores in the DSN memory via the DSnet interface 32. The DS processing module 34 may retrieve EC data slices in parallel from the DSN memory and transforms the EC data slices in parallel into data, which the DS processing module 34 communicates in parallel via the interface 30.

The interface 30 of the DS processing module 34 is coupled to the interface 30 of the first user device 14. The interface 30 may be logical if the DS processing module 34 is part of the second user device. The interfaces 30 forms a DSN memory interface to accommodate the OS file system of the user device 14 such that, from the perspective of the user device 14, data files can be stored in parallel to and retrieved in parallel from the DS processing module 34 as if the DS processing module 34 were any other compatible storage system.

The gateway module 78 couples the interface 30 to the access module 80 and may include functions to act as a portal between the user device 14 and the DS processing module 34 allowing them to communicate between protocols providing computing system interoperability. The gateway module 78 converts protocols and messages as a function of the user device 140S file system. For example, the gateway module 78 converts a retrieve-file message in the iSCSI protocol format from the first user device 14 to a dispersed storage network message in the dispersed storage network protocol to trigger the DS processing module 34 to retrieve the data and return it to the first user device 14. The gateway module 78 may include other functions including access control to prevent unauthorized use, user identification, user information retrieval, traffic monitoring, statistics generation, DS processing module 34 configuration, and DS processing module 34 management. The gateway module 78 may provide user access authentication to verify a user has permissions to perform one or more DSN memory access functions including write, read, delete, list, status, configure, and/or other functions that access the DSN memory.

The gateway module 78 may communicate second data and second corresponding information with the user device, wherein at least a portion of the second corresponding information is substantially identical to at least a portion of the corresponding information. In other words, the gateway module 78 may determine if one or more files have been substantially received at the same time for storage requests from the same user device 14 or if one or more requests for data object retrievals have been received from the same user at substantially the same time. The determination may be made by comparing time of arrival indicators in the messages or within the DS processing module 34. The gateway module 78 may indicate a parallelism status when it determines the request messages from the same user have arrived at substantially the same time.

The gateway module 78 may determine the source name and operational parameters for the user by accessing the vault associated with this user. Only one access to the vault may be required if the parallelism status has been determined. The operational parameters include a variety of optional operations and algorithm types and settings as previously discussed. The speed performance of the DS processing module may be enhanced when the data being processed uses the same parameters. The gateway module 78 passes the data files 1 through n to the access module 80.

The access module 80 may function to segment outbound second data of the second data into one or more outbound second data segments in accordance with a data storage protocol (e.g., simple object, block, aggregated block) when the DS processing module 34 functions to store data. The access module 80 may function to aggregate one or more inbound second data segments into inbound second data of the second data in accordance with the data storage protocol when the DS processing module 34 functions to retrieve data. In an embodiment, the access module 80 communicates data files, or blocks, user information, and the source name with the gateway module 78, and data segments, user information, and the source name with the grid module 82. The access module 80 creates a series of data segments 1 through Y from each of the data files, or block, 1 through n in parallel. In an embodiment, the data segments are the same size and Y will be different for each data file or block. For instance, if the data object is a image file of 4,194,304 bytes and the fixed size of each segment is 4,096 bytes, the then number of segments Y=1,024. The access module 80 may include the source name in each the data segment before passing the data segment to the grid module 82.

The grid module may function to decode a plurality of inbound encoded second data slices into an inbound second data segment of the one or more inbound second data segments in accordance with the error coding dispersal storage function when the DS processing module 34 functions to retrieve data. The grid module may function to encode an outbound second data segment of the one or more outbound second data segments into a plurality of outbound encoded second data slices in accordance with the error coding dispersal storage function when the DS processing module 34 functions to store data. For example, the grid module 82 may pre-manipulate (e.g., compression, encryption, cyclic redundancy check (CRC), etc.) the Y data segments for each data file, or block, 1 through n before creating X error coded data slices for each data segment. The grid module 82 creates XY error coded data slices for the Y data segments of each of the data files, or blocks, 1 through in parallel. In other words, the processing of the same segment number (of different files) is accomplished substantially in parallel. The grid module 82 adds forward error correction bits to the data segment bits in accordance with an error coding algorithm (e.g., Reed-Solomon) to produce an encoded data segment. The number of slices X per data segment (e.g., X=16) is chosen as a function of the error coding objectives specified by the operational parameters for this vault.

The grid module 82 slices each of the parallel encoded data segments to produce the error coded data slices. The slicing complements the error coding algorithm and accommodate the nature of dispersing error coded data slices to different DS storage units of the DSN memory. The grid module 82 may use interleaving to slice the encoded data segment such that if an entire error coded slice is lost it will not destroy a large contiguous portion of the data segment preventing reconstruction.

The size of each error coded data slice is a function of the size of the data segment and the error coding algorithm (e.g., from the operational parameters from this user's vault).

The grid module 82 may perform post-slice manipulation on the error coded data slices where the manipulation may include one or more of slice level compression, encryption, CRC, addressing, tagging, and/or other manipulation to improve the effectiveness of the computing system. The grid module 82 will use the same post-slice manipulation in parallel in accordance with the operational parameters from this user's vault.

In an embodiment, the grid module 82 may determine which DS storage units to store each error coded data slice based in part on a dispersed storage memory mapping associated with the user's vault. The same pillars will likely be specified for these EC data slices. In another embodiment, the location determination may be based in part on DS storage unit attributes including one or more of availability, self-selection, performance history, link speed, link latency, ownership, available memory, domain, cost, and more generally on one or more of a prioritization scheme, a centralized selection message from another source, a lookup table, who owns the data, and/or any other factor to optimize the operation of the computing system. The grid module 82 will pass the DS storage unit determinations on to the storage module 84 so that the storage module 84 can direct the EC data slices properly.

The grid module 82 appends a slice name to the EC data slice. The grid module 82 will pass the EC coded data slices (including the slice names) with DS storage unit determinations (e.g., the DS storage unit numbers) to the storage module 84.

The parallel nature of the grid operation creates EC data slices across every file and every slice for the same segment number in parallel. For example, in the first step, EC data slices are created for the first segment of every file, or block, 1 through n and every slice 1 through X. In the second step, EC data slices are created for the second segment of every file, or block, 1 through n and every slice 1 through X. The process continues until EC data slices have been created for Y segments of every file across every pillar X.

The storage module 84 may function to receive the plurality of inbound encoded second data slices from the plurality of DS storage units when the DS processing module functions to retrieve data. The storage module 84 may function to output the plurality of outbound encoded second data slices to the plurality of DS storage units when the DS processing module 34 functions to store data. For example, the storage module 84 may perform integrity checks on the EC data slices and then transmit the EC data slices 1 through X of each segment 1 through Y, for each file, or block, 1 through n to the DS Storage units according to the previous location determination via the DSnet interface 32. The EC data slices may be arranged in batches by pillar number since those of the same pillar are likely to be transmitted to the same DS storage unit. For example, all the segment 1 EC data slices are lined up for every file, or block, 1 through n, for pillar 1 to be transmitted in parallel to all the DS storage units in batches by pillar. In the next parallel step all the segment 2 EC data slices across all files for pillar 2 are transmitted to the DS storage units in batches by pillar. The DS storage units will store the EC data slices.

Figure 17:
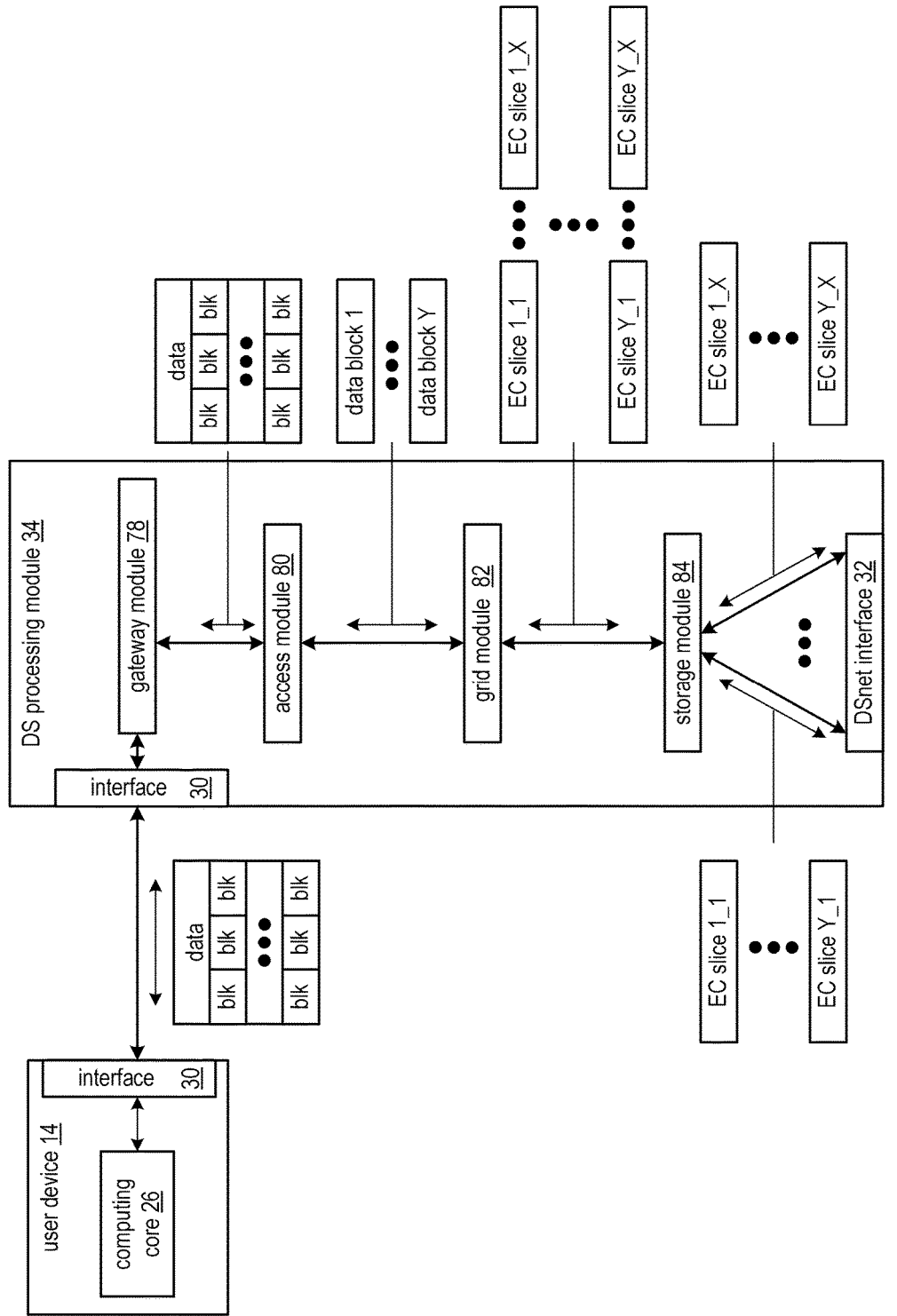
FIG. 17 is a schematic block diagram of another embodiment of a dispersed storage processing unit in accordance with the invention.

FIG. 17 is a schematic block diagram of another embodiment of a dispersed storage processing module 34 that includes the interface 30, the gateway module 78, the access module 80, the grid module 82, the storage module 84, and the DSnet interface 32. Many OS file systems offer access to an array of fixed-size data blocks. In an example, a data block may be in the range of 512 bytes to 4,096 bytes, or more.

The DS processing module 34 functions includes the transformation of data, organized in groups of blocks from the interface into error coded (EC) data slices which the DS processing module 34 stores in the DSN memory via the DSnet interface 32. The DS processing module 34 retrieves EC data slices from the DSN memory and transforms the EC data slices into data comprising data blocks to which the DS processing module 34 communicates via the interface 30.

The interface 30 of the DS processing module 34 is coupled to the interface 30 of the first user device 14. The interface 30 may be logical if the DS processing module 34 is part of the second user device. The interface 30 forms a DSN memory interface to accommodate the OS file system of the user device 14 such that, from the perspective of the user device 14, data, comprised of data blocks, can be stored to and retrieved in parallel from the DS processing module 34 as if the DS processing module 34 were any other compatible storage system.

The gateway module 78 couples the interface 30 to the access module 80 and may include functions to act as a portal between the user device 14 and the DS processing module 34 allowing them to communicate between protocols providing computing system interoperability. The gateway module 78 converts protocols and messages as a function of the user device 14 OS file system. For example, the gateway module 78 converts a retrieve-file message in the iSCSI protocol format from the first user device 14 to a dispersed storage network message in the dispersed storage network protocol to trigger the DS processing module 34 to retrieve the data and return the data to the first user device 14. The gateway module 78 may include other functions including access control to prevent unauthorized use, user identification, user information retrieval, traffic monitoring, statistics generation, DS processing module 34 configuration, and DS processing module 34 management. The gateway module 78 may provide user access authentication to verify a user has permissions to perform one or more DSN memory access functions including write, read, delete, list, status, configure, and/or other functions that access the DSN memory.

The gateway module 78 may determine the source name and operational parameters for the user by accessing the vault associated with this user. The operational parameters include a variety of optional operations and algorithm types and settings as previously discussed. The gateway module 78 passes the data to the access module 80.

In an embodiment, the access module 80 communicates data (e.g., comprised of blocks), user information, and the source name with the gateway module 78, and data blocks 1 through Y, user information, and the source name with the grid module 82. The access module 80 creates a series of data blocks 1 through Y from the data. In an embodiment, the size of each of the data blocks 1 through Y are the same size as each of the blocks of data from the user. In another embodiment, the size of each of the data blocks 1 through Y is larger than the size of each of the blocks of data from the user. In an instance, one or more of the blocks of data from the user may be packed into each data block 1 through Y when the size of each of the data blocks 1 through Y is more than twice as large as the size of each of the blocks of data from the user. The access module 80 may include the source name in each the data blocks 1 through Y before passing the data blocks 1 through Y to the grid module 82.

The grid module 82 may pre-manipulate (e.g., compression, encryption, cyclic redundancy check (CRC), etc.) the Y data blocks before creating X error coded data slices for each of the Y data blocks. The grid module 82 creates XY total error coded data slices for the Y data blocks. The grid module 82 adds forward error correction bits to the data blocks in accordance with an error coding algorithm (e.g., Reed-Solomon) to produce an encoded data block. The number of slices X per data block (e.g., X=16) is chosen as a function of the error coding objectives specified by the operational parameters for this vault.

The grid module 82 slices each of the encoded data blocks to produce the error coded data slices. The slicing complements the error coding algorithm and accommodate the nature of dispersing error coded data slices to different DS storage units of the DSN memory. The grid module 82 may use interleaving to slice the encoded data block such that if an entire error coded slice is lost it will not destroy a large contiguous portion of the data block preventing reconstruction.

The size of each error coded data slice is a function of the size of the data block and the error coding algorithm (e.g., from the operational parameters from this user's vault.

The grid module 82 may perform post-slice manipulation on the error coded data slices where the manipulation may include one or more of slice level compression, encryption, CRC, addressing, tagging, and/or other manipulation to improve the effectiveness of the computing system. The grid module 82 will use the same post-slice manipulation in parallel in accordance with the operational parameters from this user's vault.

In an embodiment, the grid module 82 may determine which DS storage units to store each error coded data slice based in part on a dispersed storage memory mapping associated with the user's vault. The same pillars will likely be specified for these EC data slices. In another embodiment, the location determination may be based in part on DS storage unit attributes including one or more of availability, self-selection, performance history, link speed, link latency, ownership, available memory, domain, cost, and more generally on one or more of a prioritization scheme, a centralized selection message from another source, a lookup table, who owns the data, and/or any other factor to optimize the operation of the computing system. The grid module 82 will pass the DS storage unit determinations on to the storage module 84 so that the storage module 84 can direct the EC data slices properly.

The grid module 82 appends a slice name to the EC data slice. The grid module 82 will pass the EC coded data slices (including the slice names) with DS storage unit determinations (e.g., the DS storage unit numbers) to the storage module 84.

The storage module 84 may perform integrity checks on the EC data slices and then transmit the EC data slices 1 through X of each data block 1 through Y to the DS Storage units according to the previous location determination via the DSnet interface 32. The DS storage units will store the EC data slices.

Figure 18:
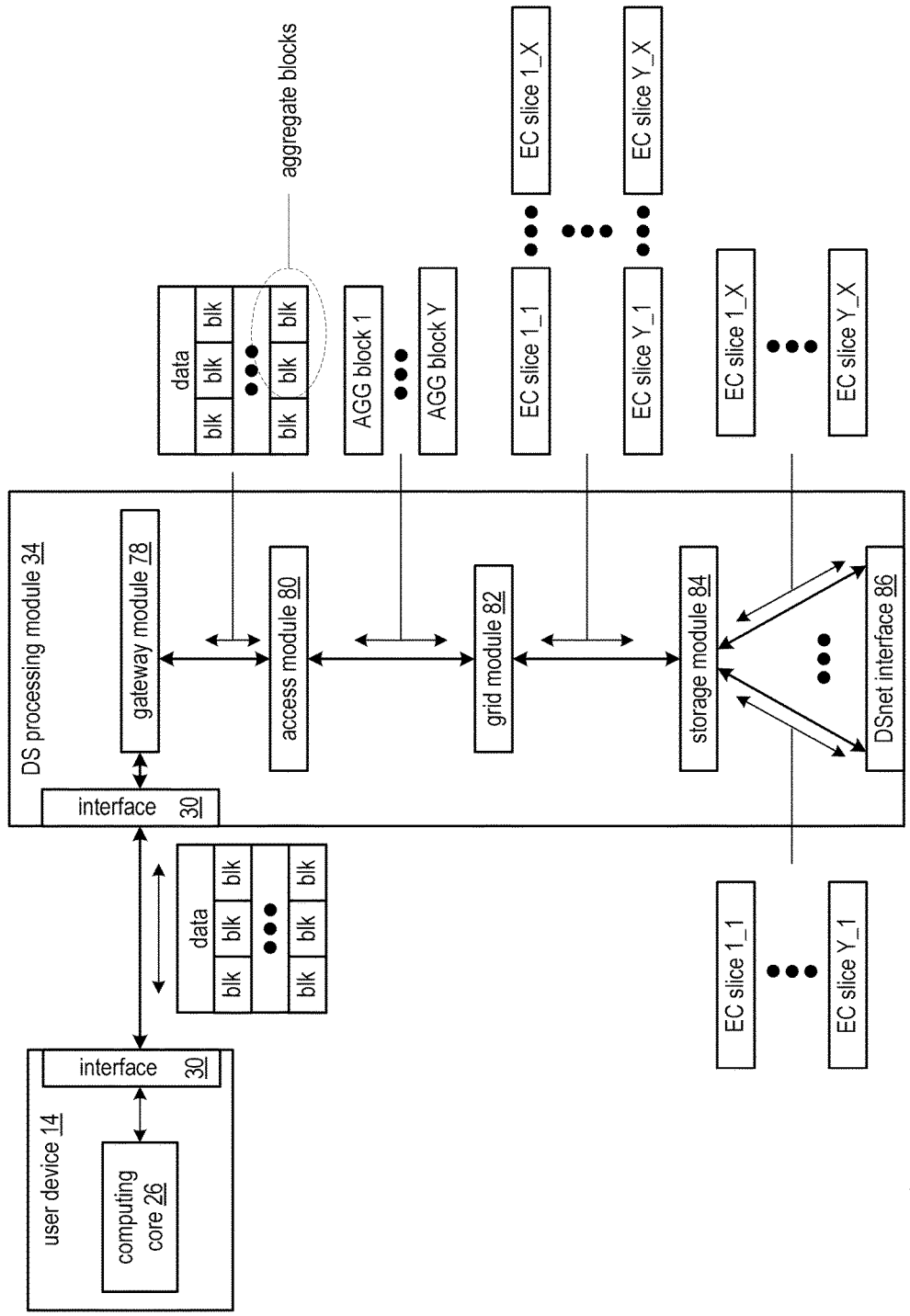
FIG. 18 is a schematic block diagram of another embodiment of a dispersed storage processing unit in accordance with the invention.

FIG. 18 is a schematic block diagram of another embodiment of a dispersed storage processing module 34 that includes the interface 30, the gateway module 78, the access module 80, the grid module 82, the storage module 84, and the DSnet interface 32. Many OS file systems offer access to an array of fixed-size data blocks. In an example, a data block may be in the range of 512 bytes to 4,096 bytes, or more.

The DS processing module 34 functions includes the transformation of incoming data (comprised of blocks) from the interface 30 into error coded (EC) data slices which the DS processing module 34 stores in the DSN memory via the DSnet interface 32. The DS processing module 34 retrieves EC data slices from the DSN memory and transforms the EC data slices into data (comprised of blocks) which the DS processing module 34 communicates via the interface 30.

The interface 30 of the DS processing module 34 is coupled to the interface 30 of the first user device 14. The interface 30 may be logical if the DS processing module 34 is part of the second user device. The interface 30 forms a DSN memory interface to accommodate the OS file system of the user device 14 such that, from the perspective of the user device 14, data, comprised of data blocks, can be stored to and retrieved in parallel from the DS processing module 34 as if the DS processing module 34 were any other compatible storage system.

The gateway module 78 couples the interface 30 to the access module 80 and may include functions to act as a portal between the user device 14 and the DS processing module 34 allowing them to communicate between protocols providing computing system interoperability. The gateway module 78 converts protocols and messages as a function of the user device OS file system. For example, the gateway module 78 converts a retrieve-file message in the iSCSI protocol format from the first user device 14 to a dispersed storage network message in the dispersed storage network protocol to trigger the DS processing module 34 to retrieve the data (comprised of blocks) and return the data to the first user device 14. The gateway module 78 may include other functions including access control to prevent unauthorized use, user identification, user information retrieval, traffic monitoring, statistics generation, DS processing module 34 configuration, and DS processing module 34 management. The gateway module 78 may provide user access authentication to verify a user has permissions to perform one or more DSN memory access functions including write, read, delete, list, status, configure, and/or other functions that access the DSN memory.

The gateway module 78 may determine the source name and operational parameters for the user by accessing the vault associated with this user. The operational parameters include a variety of optional operations and algorithm types and settings as previously discussed. The gateway module 78 passes the data blocks to the access module 80.

In an embodiment, the access module 80 communicates data (comprised of blocks), user information, and the source name with the gateway module 78, and aggregated (AGG) blocks 1 through Y, user information, and the source name with the grid module 82. The access module 80 creates a series of AGG blocks 1 through Y from the incoming data (comprised of blocks). In an embodiment, the size of each of the AGG blocks 1 through Y are at least twice that of the size of each of the incoming blocks of data. As such, two or more incoming blocks of data can be aggregated into each of the AGG blocks. In another embodiment, the size of each of the AGG blocks 1 through Y is less than twice, but larger than one of the size of each of the incoming blocks of data. In that instance, one incoming block of data may be packed into one AGG block. The access module 80 may include the source name in each the AGG blocks before passing the data AGG blocks to the grid module 82.

The grid module 82 may pre-manipulate (e.g., compression, encryption, cyclic redundancy check (CRC), etc.) the Y AGG blocks before creating X error coded data slices for each of the Y AGG blocks. The grid module 82 creates XY total error coded data slices for the Y AGG blocks. The grid module 82 adds forward error correction bits to the AGG blocks in accordance with an error coding algorithm (e.g., Reed-Solomon) to produce an encoded AGG block. The number of slices X per AGG block (e.g., X=16) is chosen as a function of the error coding objectives specified by the operational parameters for this vault.

The grid module 82 slices each of the encoded AGG blocks to produce the error coded data slices. The slicing complements the error coding algorithm and accommodate the nature of dispersing error coded data slices to different DS storage units of the DSN memory. The grid module 82 may use interleaving to slice the encoded AGG block such that if an entire error coded slice is lost it will not destroy a large contiguous portion of the AGG block preventing reconstruction.

The size of each error coded data slice is a function of the size of the AGG block and the error coding algorithm (e.g., from the operational parameters from this user's vault).

The grid module 82 may perform post-slice manipulation on the error coded data slices where the manipulation may include one or more of slice level compression, encryption, CRC, addressing, tagging, and/or other manipulation to improve the effectiveness of the computing system. The grid module 82 will use the same post-slice manipulation in parallel in accordance with the operational parameters from this user's vault.

In an embodiment, the grid module 82 may determine which DS storage units to store each error coded data slice based in part on a dispersed storage memory mapping associated with the user's vault. The same pillars will likely be specified for these EC data slices. In another embodiment, the location determination may be based in part on DS storage module 34 attributes including one or more of availability, self-selection, performance history, link speed, link latency, ownership, available memory, domain, cost, and more generally on one or more of a prioritization scheme, a centralized selection message from another source, a lookup table, who owns the data, and/or any other factor to optimize the operation of the computing system. The grid module 82 will pass the DS storage unit determinations on to the storage module 84 so that the storage module 84 can direct the EC data slices properly.

The grid module 82 appends a slice name to the EC data slice. The grid module 82 will pass the EC coded data slices (including the slice names) with DS storage unit determinations (e.g., the DS storage unit numbers) to the storage module 84.

The storage module 84 may perform integrity checks on the EC data slices and then transmit the EC data slices 1 through X of each AGG block 1 through Y to the DS Storage units according to the previous location determination via the DSnet interface 32. The DS storage units will store the EC data slices.

Figure 19:
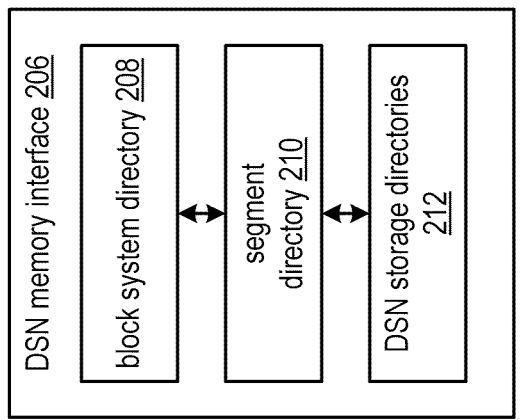
FIG. 19 is a schematic block diagram of another embodiment of a dispersed storage network memory interface in accordance with the invention.

FIG. 19 is a schematic block diagram of another embodiment of a dispersed storage network memory interface 206 for a second user device that can access the DSN memory in a native fashion (e.g., not with a legacy OS file system). The block diagram depicts linkage of directories. The DSN memory interface 206 may include an OS block system directory 208 linked to a segment directory 210 linked to DSN storage directories 212.

The OS block system directory 208 points block names directly to DS data segment names. The segment directory 210 may be indexed utilizing the DS data segment names to lookup virtual dispersed storage network (DSN) storage unit names. The DSN storage directories 212 may be indexed by the DSN storage unit names to lookup physical dispersed storage network (DSN) storage unit names.

Figure 20:
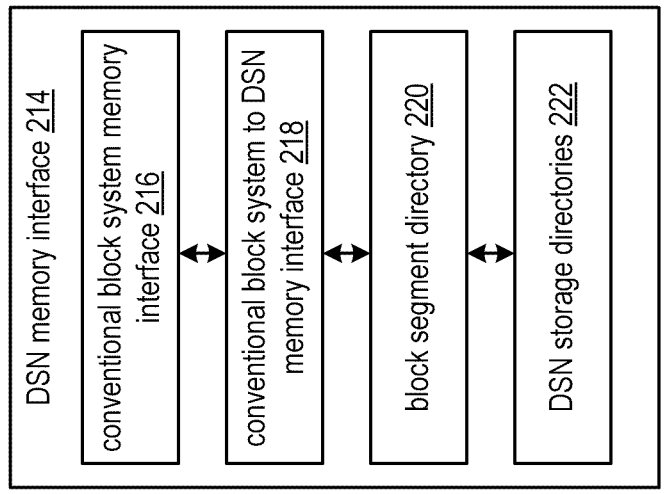
FIG. 20 is a schematic block diagram of another embodiment of a dispersed storage network memory interface in accordance with the invention.

FIG. 20 is a schematic block diagram of another embodiment of a dispersed storage network (DSN) memory interface 204 for a first user device that will access the DSN memory utilizing a legacy OS block system of the first user device. The block diagram depicts linkage of directories. The DSN memory interface 214 may include a conventional block system memory interface 216 (e.g., NFS, DFS, FFS, etc.) coupled to a conventional block system to DSN memory interface 218 coupled to the block segment directory 220 linked to DSN storage directories 222.

The legacy OS block system directory points to block names compatible with the OS block management system. The OS conventional block system memory interfaces 216 to the DSN through the conventional block system to DSN memory interface 218. The conventional block system to DSN memory interface 218 converts the OS block system format to DS block segment names. The block segment directory 220 may be indexed utilizing the DS data block names to determine virtual dispersed storage network (DSN) address names. The DSN storage directories 222 may be indexed by the virtual DSN address names to lookup physical dispersed storage network (DSN) storage unit identifiers.

Figure 21:
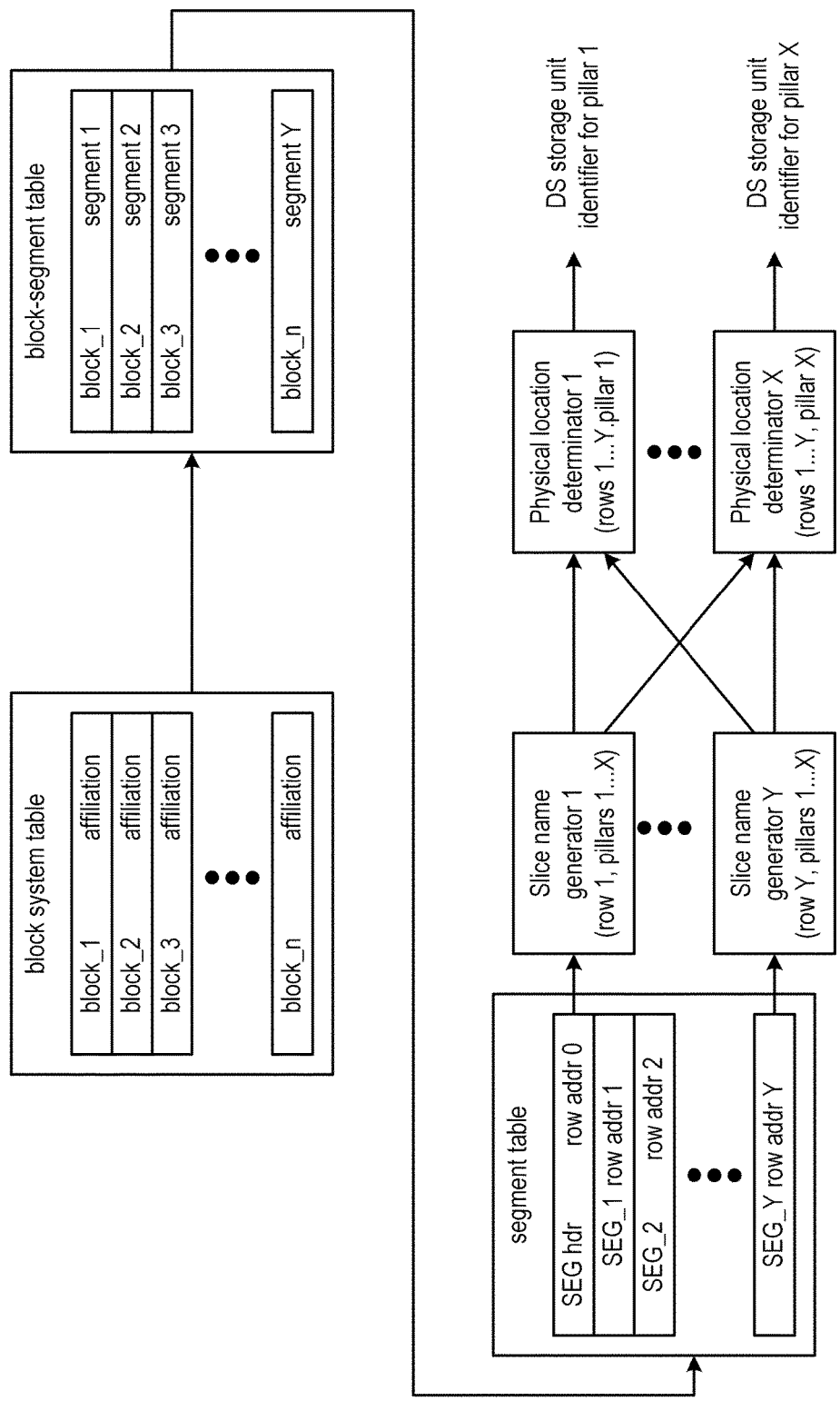
FIG. 21 is a schematic block diagram of another embodiment of a dispersed storage network memory interface in accordance with the invention.

FIG. 21 is a schematic block diagram of another embodiment of a dispersed storage network memory interface that includes a block system hierarchy of a block system table, a block-segment table, the segment directory, the plurality of slice name generators 1 through Y, and the plurality of physical location determinators 1 through X to create DSN storage unit identifiers.

The block system table entries connect OS system block numbers to an affiliation. The affiliation may include one of another list of blocks and affiliations, virtual address of the block, or physical addresses of the blocks. The block-segment table connects each block number with a DSN segment number. The block system table and block-segment table may be stored in the OS kernel memory space or the user memory space and may further be stored in any type of physical memory including local main memory, disk drive, or in the dispersed storage network memory.

The block-segment table entries point to the segment numbers in the segment table. The row address can be determined by using the segment number as the index into the segment table. The segment row address specifies the common segment number for all slice numbers of that segment.

In an alternative embodiment, the segment row addresses are determined based on the source name derived from the user information and block number. The source name contains the vault identifier. The vault identifier points to the vault where the user operational parameters are stored include width X and segment size. The number of segments Y is calculated by dividing the file size by the segment size. The row addresses are deduced by setting the slice identifier to 1 and populating the slice name fields with the vault identifier, the reserved bits in accordance with the vault, the generation number in accordance with the vault or user provided information, the file/block number and varying the segment numbers from 1 to Y.

The plurality of slice name generators deduced the rest of the slice name addresses to create the complete virtual DSN address. The slice identifier fields are varied from 1 to X.

The plurality of physical location determinators 1 through X utilize the full slice names for all segments by pillar to determine the DSN storage unit identifiers for each pillar 1 through X. The determination is accomplished by using the slice name as an index into a table of ranges to determine the DS storage unit identifiers for the ranges of slices names by sorting by vault and pillar numbers.

Figure 22:
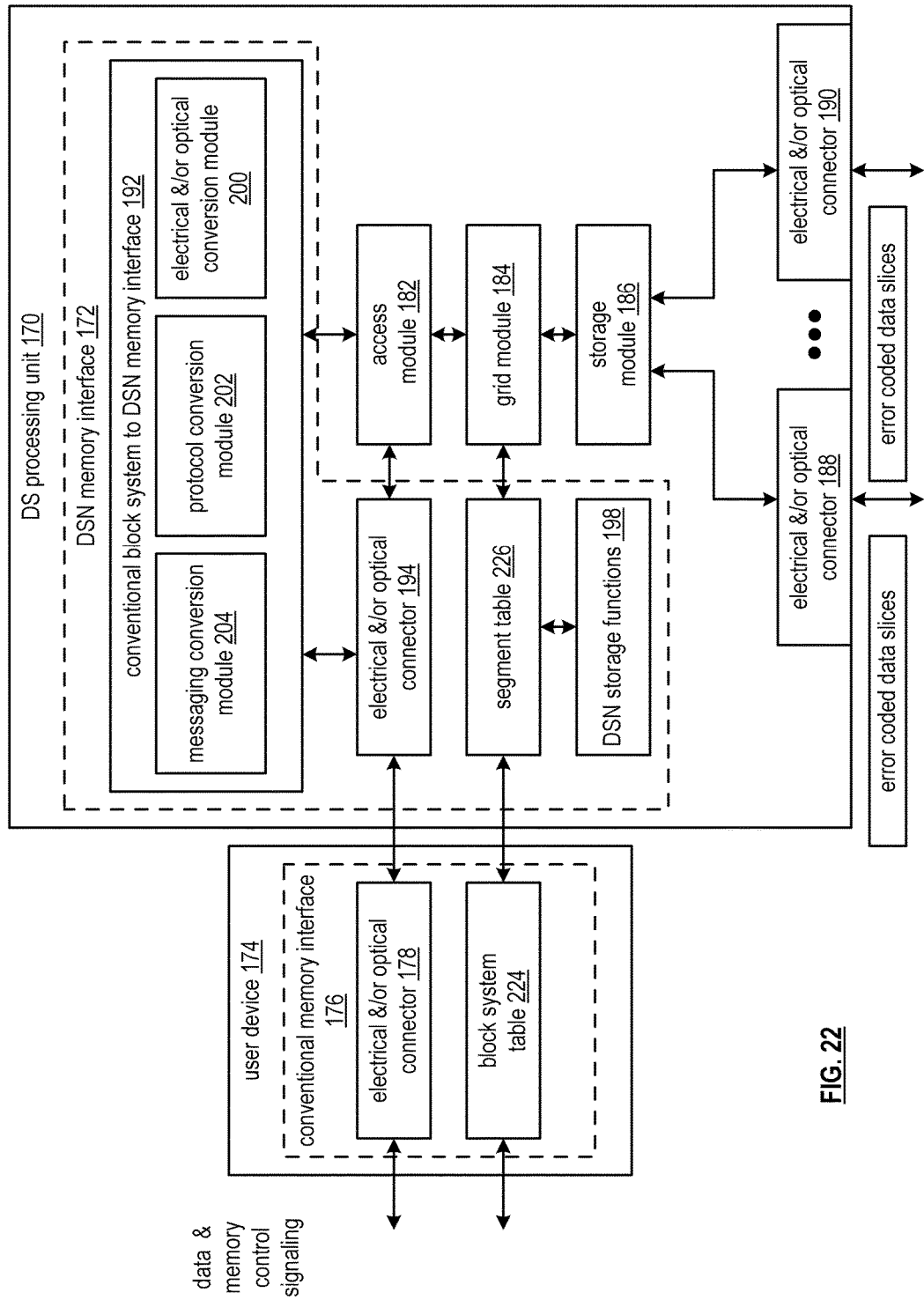
FIG. 22 is a schematic block diagram of another embodiment of a dispersed storage network memory interface in accordance with the invention.

FIG. 22 is a schematic block diagram of another embodiment of a dispersed storage network memory interface 172 including the physical and memory management paths between the user device 174 and the DS processing unit 170. The user device 174 may include the conventional memory interface 176 comprising an electrical and/or optical connector 178 and the block system table 224. The DS processing unit 170 may include the DSN memory interface 172, the access module 182, the grid module 184, the storage module 186, and a plurality of electrical and/or optical connectors 188-190. The DSN memory interface 172 may include the conventional block system to DSN memory interface 192, the electrical and/or optical connector 194, the segment table 226, and the DSN storage functions 198. The conventional block system to DSN memory interface 192 may include an electrical and/or optical conversion module 200, a protocol conversion module 202, and a messaging conversion module 204.

The electrical and/or optical connector 178, 188-190, 194 is an electrically conductive or light-wave spectrum conductive device that joins electrical or optical circuits together. Connectivity between two connectors is provided directly (e.g., connector to connector) or via an intermediary electrical or optical signal conductor (e.g., wire or a light fiber).

In another embodiment, the electrical and/or optical connector 178, 188-190, 194 is replaced or augmented by a wireless transceiver that can communicate wireless signals between devices and units either directly or indirectly through a wireless infrastructure or unit-to-unit wireless hopping method.

The electrical and/or optical connector 178, 188-190, 194 provides signal connectivity between the user device 174 and the DS processing unit 170, and between the DS processing unit 170 and the DS storage unit (and other units) via the network. The electrical signals convey the messaging and data transfer and may be constructed in accordance with a standard including Recommended Standard 232 (RS-232), RS-422, and IEEE 802.3.

The electrical &/or optical conversion module 200 may provide conversion between electrical signals on the wire or light signals on the fiber and the electrical signals within the DS processing unit 170. The protocol conversion module 202 converts between the electrical signals within the DS processing unit 170 and the protocols that the electrical signals represent. For example, 10 gigabit Ethernet uses internet protocols (IP) over 10 GBASE-T physical connectivity defined in the IEEE 802.3-2008 standards.

The messaging conversion module 204 converts between the protocols (e.g., IP) and the messages used to convey memory management functions. For example, the messaging conversion module 204 may convert iSCSI, NFS, DFS, FFS and or other file system messages from the OS file/block system of the user device 174 into DSN memory messages used by the DS processing unit 170.

The DSN storage functions 198 may assist the conventional file system to DSN memory interface 192 translate between the block system table 224 of the OS file/block system and the DSN memory. For example, the DSN storage functions 198 may provide the operational parameters for the user by reading the operational parameter from the vault associated with the user. For example, a read request message from the user may indicate the user identification and block name to be read. The access module 182, grid module 184, and or storage module 186 may forward the user identification information to the DSN storage functions 198 seeking the operational parameters of the DSN for this user.

In an example of operation, the user device 174 signals a request message to read a block using iSCSI over the Ethernet cable between the user device 174 electrical &/or optical connector 178 and the electrical &/or optical connector 194 of the DSN memory interface 172 in the DS processing unit 170. The electrical &/or optical conversion module 200 converts the physical Ethernet signals into internal DSN memory electrical signals that are converted by the protocol conversion module 202 into the IP message. The messaging conversion module 204 converts the iSCSI message from the IP message into the DS memory message indicating the identity of the user device 174, the request, and the block name requested. The access module 182 and grid module 184 determine the virtual DSN address (slice names) and determine the locations of the EC data slices corresponding to the block as previously described. The storage module 186 signals the DS storage units where the EC data slices are stored to retrieve the EC data slices corresponding to the block as previously described. The grid module 184 and access module 182 decode the EC data slices and recreate the block as previously described. The access module 182 provides the block to the conventional block system to DSN memory interface to format the response to the user device 174. The messaging conversion module 204 packs the block into a iSCSI response and passes the response to the protocol conversion module 202 to convert the response into the IP message electrical signals. The IP message electrical signals are converted by the electrical &/or optical conversion module 200 to the electrical or optical signals for transmission through the electrical &/or optical connector 194 to the Ethernet wire. The electrical &/or optical connector 178 of the user device 174 coupled to the Ethernet wire receives the iSCSI message and provides it to the OS file/block system for further processing.

Figure 23:
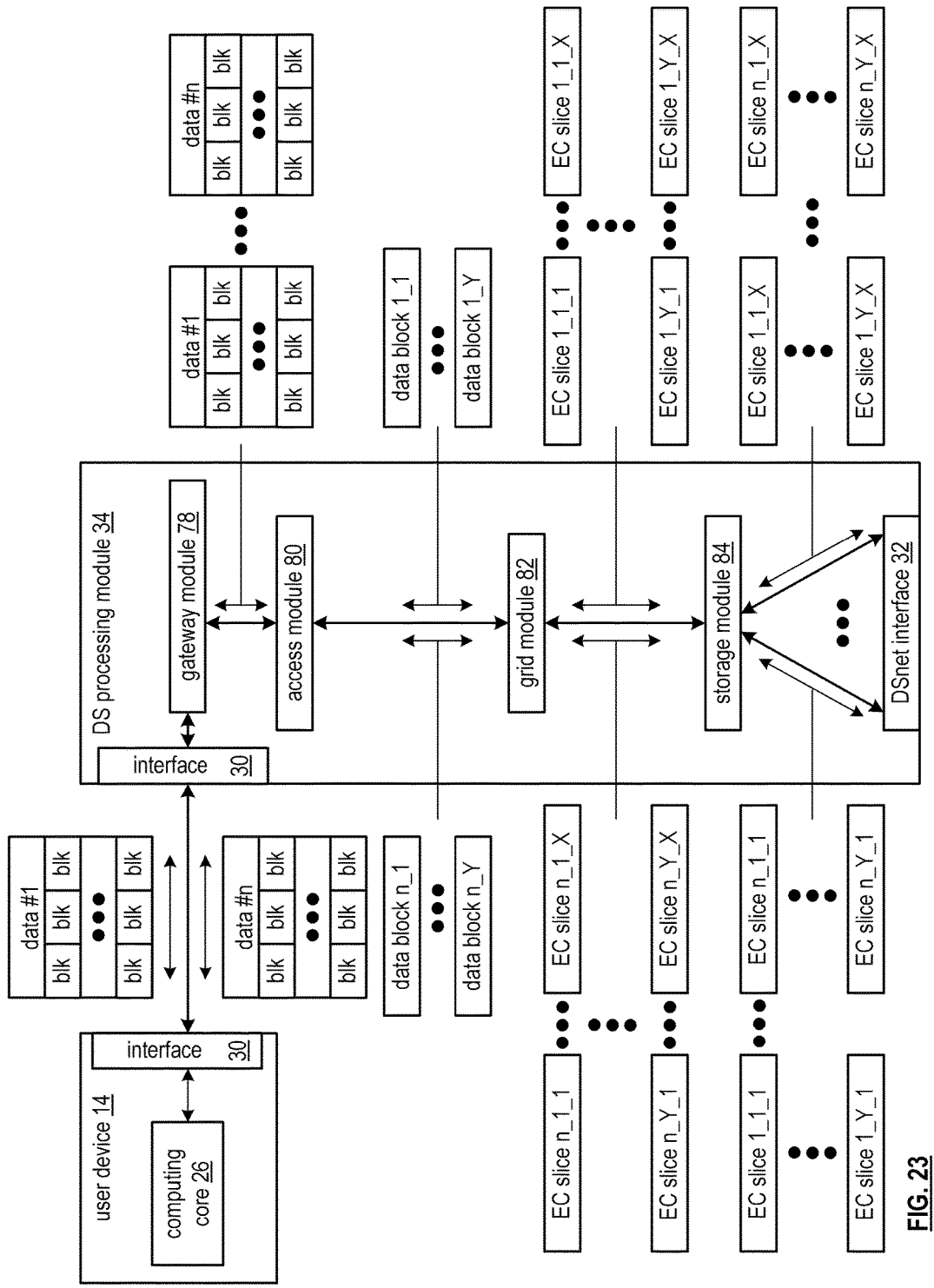
FIG. 23 is a schematic block diagram of another embodiment of a dispersed storage processing unit in accordance with the invention.

FIG. 23 is a schematic block diagram of another embodiment of a dispersed storage processing module 34 that includes the interface 30, the gateway module 78, the access module 80, the grid module 82, the storage module 84, and the DSnet interface 32. Many OS file systems offer access to an array of fixed-size data blocks. In an example, a data block may be in the range of 512 bytes to 4,096 bytes, or more.

The DS processing module 34 functions includes the transformation of data 1 through n (where each data 1 through n comprises blocks of data) in parallel from the interface 30 into error coded (EC) data slices which the DS processing module 34 stores in the DSN memory via the DSnet interface 32. The DS processing module 34 retrieves EC data slices in parallel from the DSN memory and transforms the EC data slices in parallel into data 1 through n which the DS processing module 34 communicates in parallel via the interface 30.

The interface 30 of the DS processing module 34 is coupled to the interface 30 of the first user device 14. The interface 30 may be logical if the DS processing module 34 is part of the second user device. The interface 30 forms a DSN memory interface to accommodate the OS file system of the user device 14 such that, from the perspective of the user device 14, data, comprised of data blocks, can be stored to and retrieved in parallel from the DS processing module 34 as if the DS processing module 34 were any other compatible storage system.

The gateway module 78 couples the interface 30 to the access module 80 and may include functions to act as a portal between the user device 14 and the DS processing module 34 allowing them to communicate between protocols providing computing system interoperability. The gateway module 78 converts protocols and messages as a function of the user device 14 OS file system. For example, the gateway module 78 converts a retrieve-file message in the iSCSI protocol format from the first user device 14 to a dispersed storage network message in the dispersed storage network protocol to trigger the DS processing module 34 to retrieve EC data slices and return data 1 through n to the first user device. The gateway module 78 may include other functions including access control to prevent unauthorized use, user identification, user information retrieval, traffic monitoring, statistics generation, DS processing module 34 configuration, and DS processing module 34 management.

The gateway module 78 may provide user access authentication to verify a user has permissions to perform one or more DSN memory access functions including write, read, delete, list, status, configure, and/or other functions that access the DSN memory.

The gateway module 78 may determine if one or more data 1 through n have been substantially received at the same time for storage requests from the same user device 14 or if one or more requests for data 1 through n retrievals have been received from the same user at substantially the same time. The determination may be made by comparing time of arrival indicators in the messages or within the DS processing module 34. The gateway module 78 may indicate a parallelism status when it determines the request messages from the same user have arrived at substantially the same time.

The gateway module 78 may determine the source name and operational parameters for the user by accessing the vault associated with this user. Only one access to the vault may be required if the parallelism status has been determined. The operational parameters include a variety of optional operations and algorithm types and settings as previously discussed. The speed performance of the DS processing module may be enhanced when the data 1 through n being processed uses the same parameters. The gateway module 78 passes the data 1 through n to the access module 80.

In an embodiment, the access module 80 communicates data 1 through n, user information, and the source name with the gateway module 78, and data blocks 1 through Y (for each data 1 through n), user information, and the source name with the grid module 82. The access module 80 creates a series of data blocks 1 through Y from each of the data 1 through n in parallel. In an embodiment, the data blocks are the same size and Y will be different for each data 1 through n. The access module 48 may include the source name in each of the data blocks 1 through Y, for each data 1 through n before passing the data blocks to the grid module 82.

The grid module 82 may pre-manipulate (e.g., compression, encryption, cyclic redundancy check (CRC), etc.) the Y data blocks for each data 1 through n before creating X error coded data slices for each data block 1 through Y. The grid module 82 creates XY error coded data slices for the Y data blocks of each of the data 1 through n, in parallel. In other words, the processing of the same data block number (of different data 1 through n) is accomplished substantially in parallel. The grid module 82 adds forward error correction bits to the data segment bits in accordance with an error coding algorithm (e.g., Reed-Solomon) to produce an encoded data block. The number of slices X per data block (e.g., X=16) is chosen as a function of the error coding objectives specified by the operational parameters for this vault.

The grid module 82 slices each of the parallel encoded data blocks to produce the error coded data slices. The slicing complements the error coding algorithm and accommodate the nature of dispersing error coded data slices to different DS storage units of the DSN memory. The grid module 82 may use interleaving to slice the encoded data block such that if an entire error coded slice is lost it will not destroy a large contiguous portion of the data segment preventing reconstruction.

The size of each error coded data slice is a function of the size of the data block and the error coding algorithm (e.g., from the operational parameters from this user's vault).

The grid module 82 may perform post-slice manipulation on the error coded data slices where the manipulation may include one or more of slice level compression, encryption, CRC, addressing, tagging, and/or other manipulation to improve the effectiveness of the computing system. The grid module 82 will use the same post-slice manipulation in parallel in accordance with the operational parameters from this user's vault.

In an embodiment, the grid module 82 may determine which DS storage units to store each error coded data slice based in part on a dispersed storage memory mapping associated with the user's vault. In another embodiment, the location determination may be based in part on DS storage unit attributes including one or more of availability, self-selection, performance history, link speed, link latency, ownership, available memory, domain, cost, and more generally on one or more of a prioritization scheme, a centralized selection message from another source, a lookup table, who owns the data, and/or any other factor to optimize the operation of the computing system. The grid module 82 will pass the DS storage unit determinations on to the storage module 84 so that the storage module 84 can direct the EC data slices properly.

The grid module 82 appends a slice name to the EC data slice. The grid module 82 will pass the EC coded data slices (including the slice names) with DS storage unit determinations (e.g., the DS storage unit numbers) to the storage module 84.

The parallel nature of the grid operation creates EC data slices across every data 1 through n and every slice 1 through X for the same data block number in parallel. For example, in the first step, EC data slices are created for the first data block of every data, 1 through n and every slice 1 through X. In the second step, EC data slices are created for the second data block of every data 1 through n and every slice 1 through X. The process continues until EC data slices have been created for Y data blocks of every data 1 through n across every pillar X.

The storage module 84 may perform integrity checks on the EC data slices and then transmit the EC data slices 1 through X of each segment 1 through Y, for each file, or block, 1 through n to the DS Storage units according to the previous location determination via the DSnet interface 32. The EC data slices may be arranged in batches by pillar number since those of the same pillar are likely to be transmitted to the same DS storage unit. For example, all the data block 1 EC data slices are lined up for every data 1 through n, for pillar 1 to be transmitted in parallel to all the DS storage units in batches by pillar. In the next parallel step all the data block 2 EC data slices across all data 1 through n, for pillar 2 are transmitted to the DS storage units in batches by pillar. The DS storage units will store the EC data slices.

Figure 24:
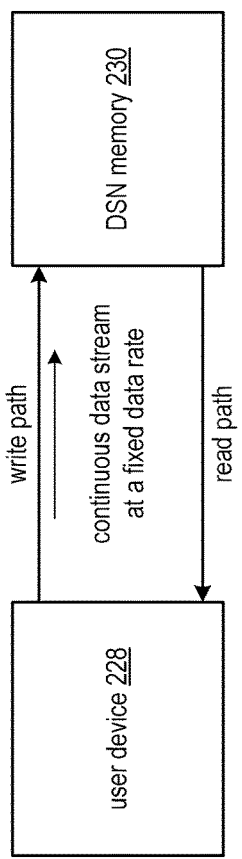
FIG. 24 is a schematic block diagram of another embodiment of a dispersed storage network memory interface in accordance with the invention.

FIG. 24 is a schematic block diagram of another embodiment of a dispersed storage network memory interface that includes the DSN memory 230 and the user device 228. The user device 228 utilizes a write path to transfer data to storage to the DSN memory 230. The DSN memory 230 utilizes a read path to transfer data from storage to the user device 228. The DSN memory 230 may be implemented with one or more of the user device 228, the DS processing unit, the DS storage unit, the DS managing unit, and/or the DS integrity processing unit.

The write path and read path support a data flow of information. The data flow may be continuous or non-continuous where data transferred continuously over a given time period is an example of continuous data flow. Non-continuous data flow may be bursty if the data flow starts and stops over a given time period (e.g., in a series of bursts of data flow with lulls between the bursts). Data being transferred (e.g., while data is flowing) may have a fixed or variable data transmission rate (e.g., bits per second).

The data flow of information may represent a non-real-time data object or a real-time data object. For example, a non-real-time data flow may include a stored text document, a stored music file, a stored video file, or any other data that is not a direct result of a currently real-time event. A real-time data flow may be produced as a result of a live data transaction such as a radio broadcast of music, an internet audio streaming of a live music event, an internet video and audio streaming of a live news event, a live video stream of a security camera, a live stream of stock trades from a stock exchange, or any other data resulting from a live event.

Non-real-time data may be transferred with the non-continuous or bursty data flows since the amount of the data is static (e.g., a 5 megabyte picture file or a 4 gigabyte video file) such that eventually all the data will be transferred in time, even with a variable data transmission rate. Real-time data may be transferred with the continuous data flow to avoid missing data since the source of the data is continuous over a substantially long time period. Real-time data may be transferred with a fixed transmission rate or variable transmission rate such that an average data transmission rate is greater than the data transmission rate of the source. For example, data from an IP security camera may source data at a constant rate of 256 kilobits per second over a continuous data flow with a fixed data transmission rate of 256 kilobits per second. In another example, data from a high definition broadcast camera may source data at a variable rate between 10 megabits per second and 15 megabits per second over a continuous data flow with a variable data transmission rate up to 15 megabits per second.

The user device 228 may produce a data flow on the write path to the DSN memory 230 with the continuous data stream at a fixed data rate to accommodate the real-time data source. The write path and read path may contain the continuous data flow with the fixed transmission rate, the continuous data flow with the variable transmission rate, the non-continuous data flow with the fixed transmission rate, and the non-continuous data flow with the variable transmission rate.

Figure 25:
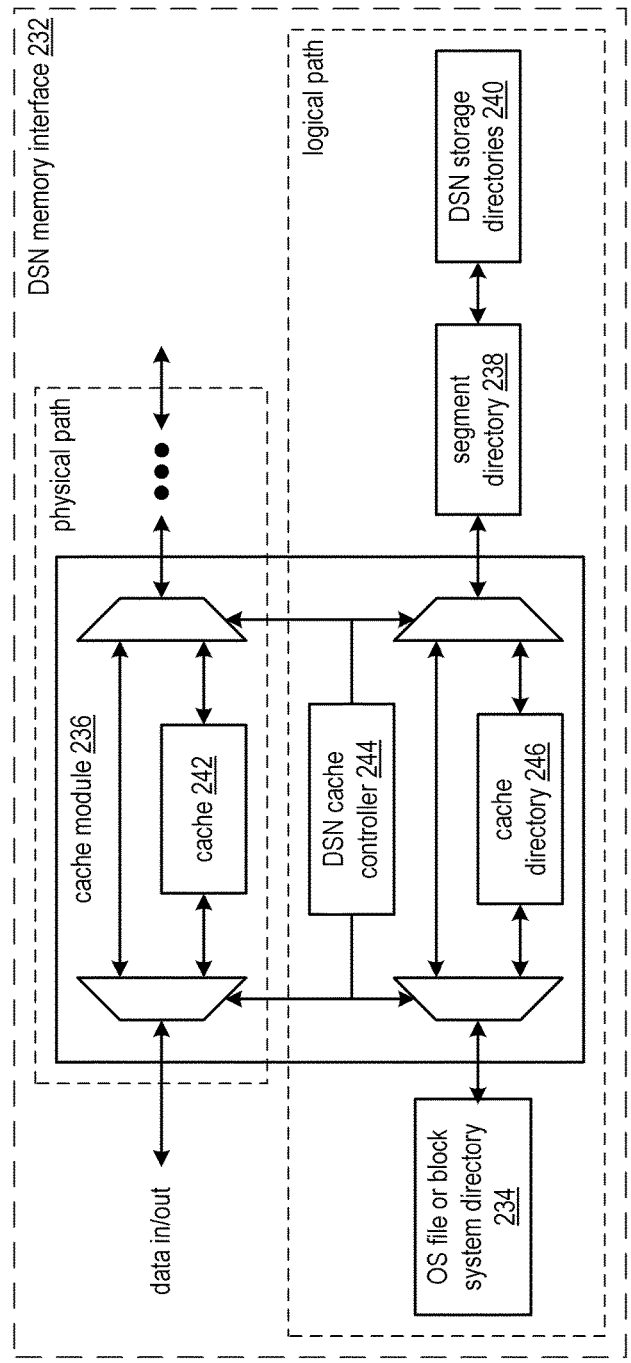
FIG. 25 is a schematic block diagram of another embodiment of a dispersed storage network memory interface in accordance with the invention.

FIG. 25 is a schematic block diagram of another embodiment of a dispersed storage network memory interface 232 that includes an OS file or block system directory 234, a cache module 236, the segment directory 238, and the DSN storage directories 240. The cache module 236 may include a plurality of multiplexers, a cache 242, a DSN cache controller 244, and a cache directory 246. The cache 242 may be any type of memory including the main memory, a local disk drive, the flash, and/or the DSN memory. The size of the cache 242 may be fixed or dynamic as a function of a user operational parameter, a command from the DS managing unit, a command from the user device, and/or a DSN caching algorithm which will be discussed in greater detail below.

A physical path comprises a multiplexer coupled to a data in/out path (e.g., to the user device), the cache 242, and a multiplexer coupled to the DSN memory. A logical path comprises the OS file or block system directory 234, a logical multiplexer coupled to a data in/out path, the DSN cache controller 244, the cache directory 246, a logical multiplexer coupled to the DSN memory, the segment directory 238, and the DSN storage directories 240.

The DSN memory interface 232 may be wholly a part of the DSN memory, wholly a part of the user device, or part of both the DSN memory and user device. The cache module 236 will accommodate the continuous data flow with the fixed or variable transmission rate from either the data in/out (e.g., user device) or the DSN memory even though the writes and reads to/from the DSN memory may not be continuous.

The DSN cache controller 244 operates the physical multiplexers to switch such that the data flow is either routed directly between the data in/out (e.g., for the user device) and the DSN memory for no caching or through the cache 242 when caching is enabled. The cache 242 temporarily stores data until which time it can be read out and passed on when the data flow is routed through the cache 242. The cache 242 operation may be configured for first in first out (FIFO), last in last out (LIFO), or some other method of prioritization.

The DSN controller 244 determines when to enable or disable caching. The determination may be a function of one or more of a command from the DS managing unit, a command from the user device, a command from the DS processing unit, a command from the DS storage unit, and/or the DSN caching algorithm.

The DSN controller 244 will execute the DSN caching algorithm by collecting performance data and determining caching status and caching parameters. The DSN caching algorithm may be executed by one or more of the DSN controller 244, the DS processing unit, the user device, the DS managing unit, the DS storage unit, and/or the DS storage integrity processing unit. Performance data may include data flow rates from the user device, data flow rates to the DSN memory, data flow rates from the DSN memory, and data flow rates to the user device. Caching status may include an enabled state or disabled state for each direction (e.g., inbound and outbound with respect to the DSN memory). Caching parameters may include cache 242 size for inbound memory, cache size for outbound memory, file types to always cache, file types to always not cache, user identifiers to cache, and user identifiers to not cache. In an embodiment, the DSN controller 244 may enable caching of inbound data flow when the performance data indicates that the peak data flow rate from the user device is greater than the average data flow rate to the DSN memory. In another embodiment, the DSN controller 244 may disable caching of inbound data flow when the performance data indicates that the peak data flow rate from the user device is less than the average data flow rate to the DSN memory. Caching may or may not be enabled and disable on boundaries of data streams. In an embodiment, caching is disabled when the DSN memory empties the inbound data flow cache.

The DSN cache controller 244 operates the logical multiplexers to link in a cache directory 246 between the OS file or block system directory 234 and segment directory 238 when caching is enabled. The DSN cache controller 244 will update the cache directory 246 with cache addresses of the temporarily stored data objects. The cache directory 246 will be discussed in greater detail with reference to FIGS. 26 and 27.

In an example of operation, when inbound data flow caching is enabled, a video stream is received from the user device. The DSN cache controller 244 activates the multiplexer to store the incoming video stream in cache 242 as segments. The DSN controller 244 enters the cache address of the video stream into the cache directory 246 utilizing the OS file system directory 234. The DSN controller 244 activates the multiplexer to retrieve video stream segments from the cache 242 to send to the DSN memory. The DSN controller 244 updates the segment directory 238 utilizing the information from the cache directory 246.

Figure 26:
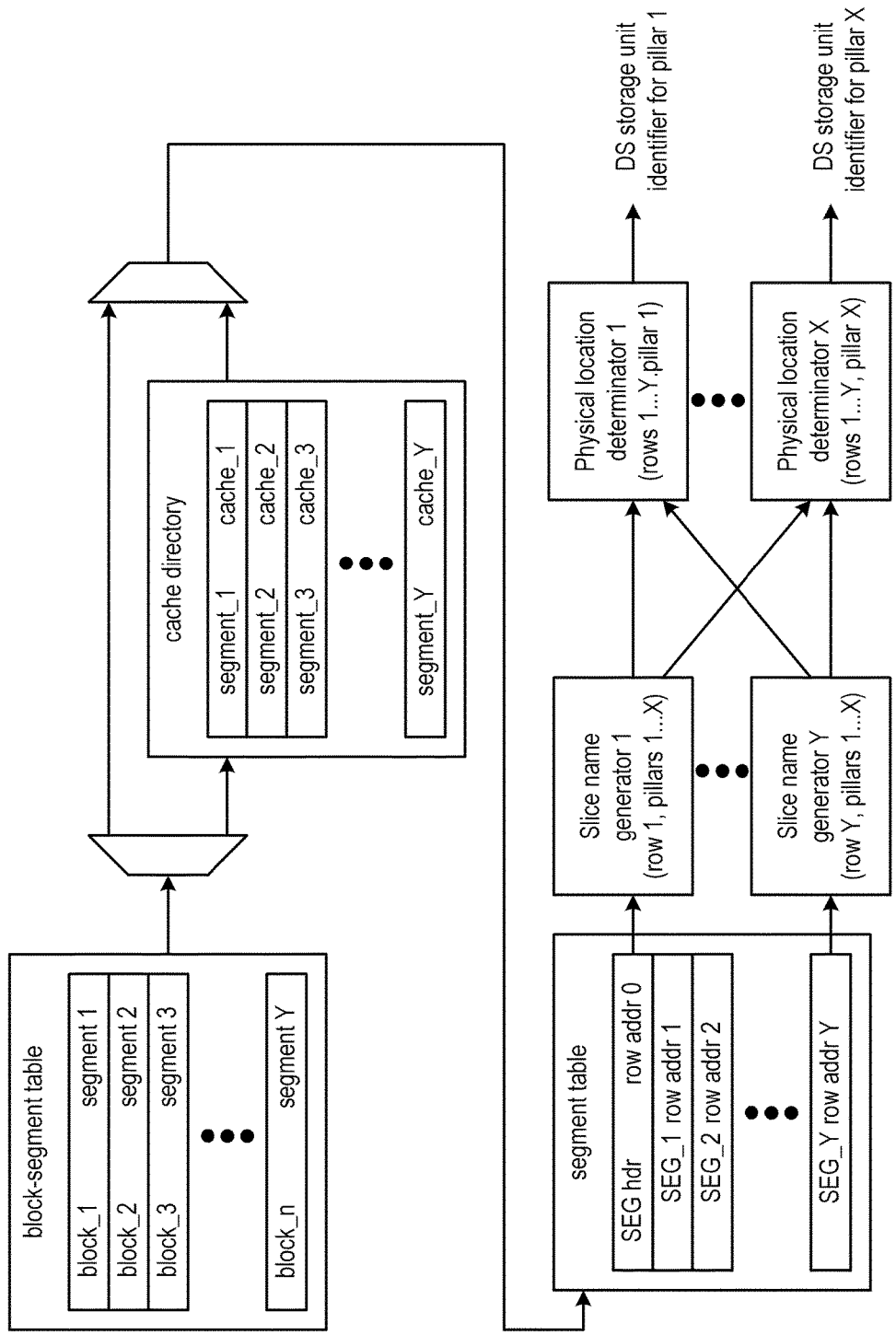
FIG. 26 is a schematic block diagram of another embodiment of a dispersed storage network memory interface in accordance with the invention.

FIG. 26 is a schematic block diagram of another embodiment of a dispersed storage network memory interface that includes a block system hierarchy of a block-segment table, the cache directory, the segment table, the plurality of slice name generators 1 through Y, and the plurality of physical location determinators 1 through X to create DSN storage unit identifiers.

The block-segment table connects each block number with a DSN segment number. The block-segment table may be stored in the OS kernel memory space or the user memory space and may further be stored in any type of physical memory including local main memory, disk drive, or in the dispersed storage network memory.

The block-segment table entries point to the segment numbers in the cache directory. The address of the cache for each segment is retrieved from the cache directory utilizing the segment number as the index. If caching is disabled, the cache directory is not utilized and the block-segment table links directly to the segment table.

The cache address links to the segment table when caching is enabled by populating the segment table with the segment number for each cache address. The cache address now becomes part of the file path name. The cache address is temporary since the segment number is linked on both sides of the cache address. The cache address for each segment may be discarded after the segment has been stored in the DSN memory. The virtual DSN memory map row address can be determined by using the segment number as the index into the segment table. The segment row address specifies the common segment number for all slice numbers of that segment.

In an alternative embodiment, the segment row addresses are determined based on the source name derived from the user information and block number. The source name contains the vault identifier. The vault identifier points to the vault where the user operational parameters are stored include width X and segment size. The number of segments Y is calculated by dividing the file size by the segment size. The row addresses are deduced by setting the slice identifier to 1 and populating the slice name fields with the vault identifier, the reserved bits in accordance with the vault, the generation number in accordance with the vault or user provided information, the file/block number and varying the segment numbers from 1 to Y.

The plurality of slice name generators deduced the rest of the slice name addresses to create the complete virtual DSN address. The slice identifier fields are varied from 1 to X.

The plurality of physical location determinators 1 through X utilize the full slice names for all segments by pillar to determine the DSN storage unit identifiers for each pillar 1 through X. The determination is accomplished by using the slice name as an index into a table of ranges to determine the DS storage unit identifiers for the ranges of slices names by sorting by vault and pillar numbers.

Figure 27:
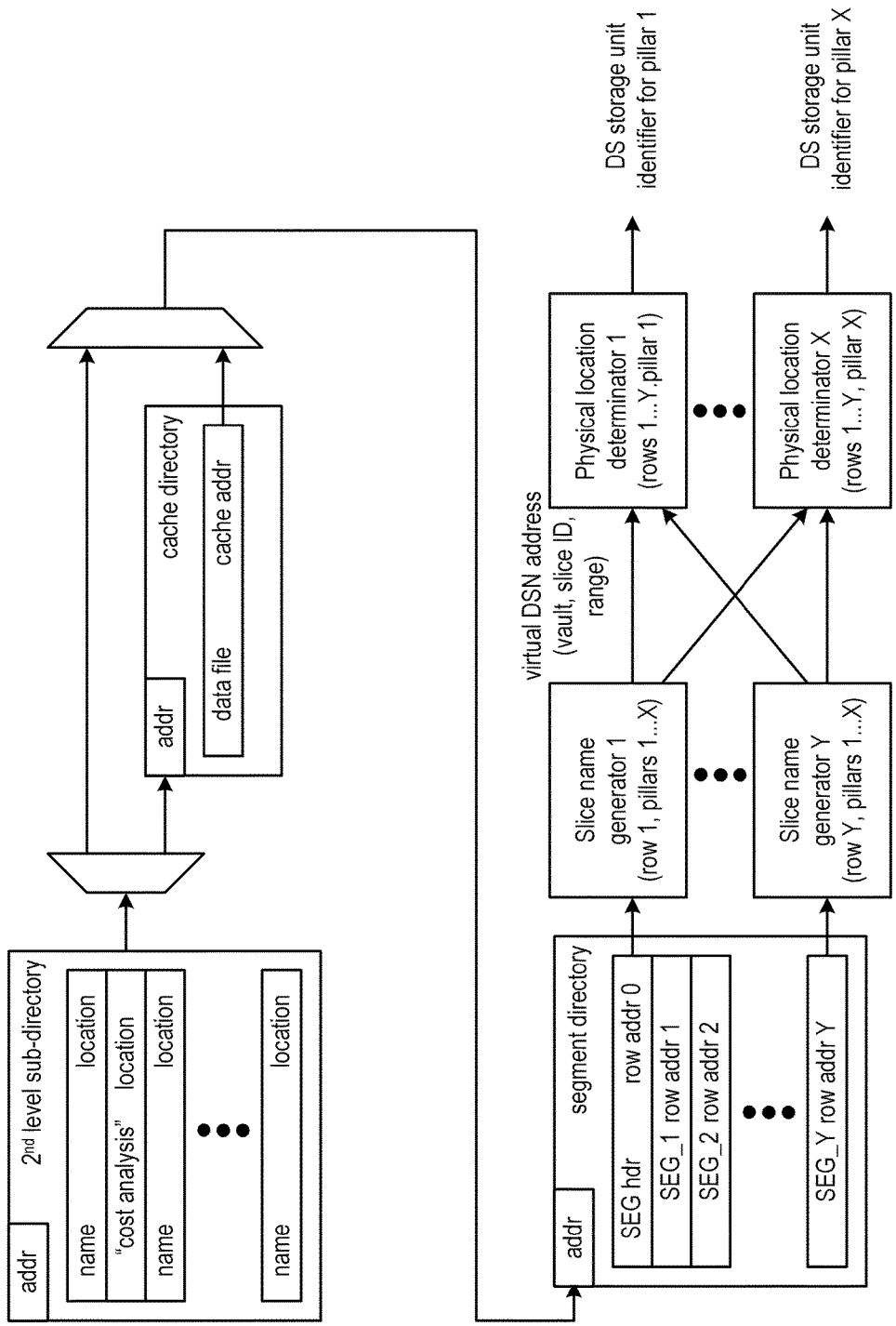
FIG. 27 is a schematic block diagram of another embodiment of a dispersed storage network memory interface in accordance with the invention.

FIG. 27 is a schematic block diagram of another embodiment of a dispersed storage network memory interface that includes the file system hierarchy of the $2^{nd}$ level sub-directory, the cache directory, the segment directory, the plurality of slice name generators 1 through Y, and the plurality of physical location determinators 1 through X to create DSN storage unit identifiers.

The $2^{nd}$ level sub-directory may connect a file name to a location where the segment directory resides when caching is off. The $2^{nd}$ level sub-directory may connect a file name to a location where the cache directory resides when caching is on. The cache directory may be stored in the OS kernel memory space or the user memory space and may further be stored in any type of physical memory including local main memory, disk drive, or in the dispersed storage network memory.

The $2^{nd}$ level sub-directory may point to address in the cache directory that lists the cache address for the given file name. The cache address is utilized as pointer to the segment directory containing segment-to-row address entries for this data file name. The virtual DSN memory map row address can be determined by using the segment number as the index into the segment table. The segment row address specifies the common segment number for all slice numbers of that segment.

In an alternative embodiment, the segment row addresses are determined based on the source name derived from the user information and block number. The source name contains the vault identifier. The vault identifier points to the vault where the user operational parameters are stored include width X and segment size. The number of segments Y is calculated by dividing the file size by the segment size. The row addresses are deduced by setting the slice identifier to 1 and populating the slice name fields with the vault identifier, the reserved bits in accordance with the vault, the generation number in accordance with the vault or user provided information, the file/block number and varying the segment numbers from 1 to Y.

The plurality of slice name generators deduced the rest of the slice name addresses to create the complete virtual DSN address. The slice identifier fields are varied from 1 to X.

The plurality of physical location determinators 1 through X utilize the full slice names for all segments by pillar to determine the DSN storage unit identifiers for each pillar 1 through X. The determination is accomplished by using the slice name as an index into a table of ranges to determine the DS storage unit identifiers for the ranges of slices names by sorting by vault and pillar numbers.

Figure 28:
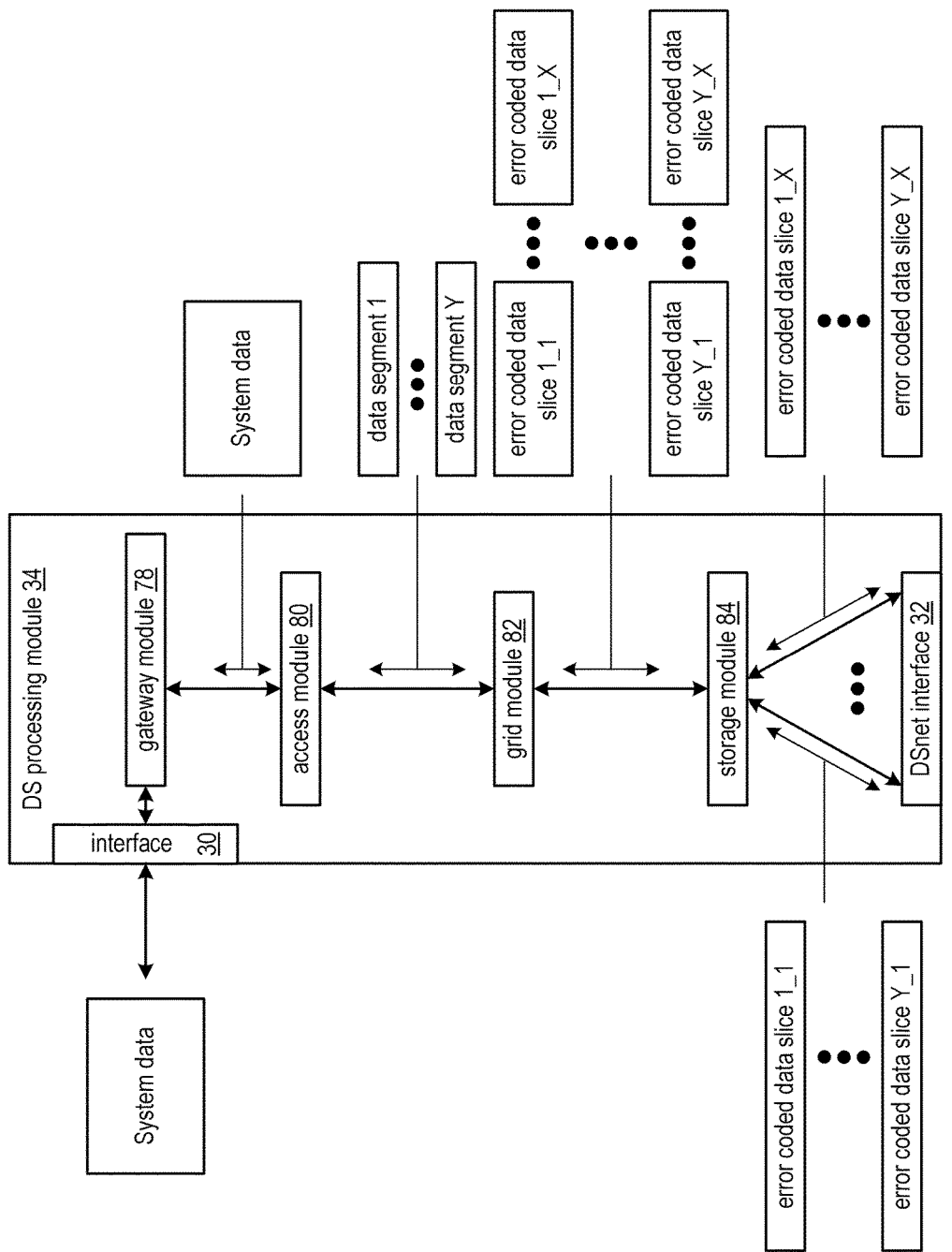
FIG. 28 is a schematic block diagram of another embodiment of a dispersed storage processing unit in accordance with the invention.

FIG. 28 is a schematic block diagram of another embodiment of a dispersed storage processing module 34 that includes the interface 30, the gateway module 78, the access module 80, the grid module 82, the storage module 84, and the DSnet interface 32.

The DS processing module 34 functions includes the transformation of corresponding information (system data) into error coded (EC) data slices for storage in the DSN memory via the DSnet interface 32. The corresponding information may include one or more of but not limited to a process identifier (e.g., an internal process/application ID), metadata, a file system directory, a block number, a transaction message, a user device identity (ID), a data object identifier, a source name, and/or user information. The system data may include data that the system utilizes to operate including one or more of the file system directories, the user operational parameters, the block system table, the segment table, the segment directory, the segment and slice directory, the block-segment table, the block system table, the block system directory, the DSN storage directories, the OS system directories, the virtual DSN address to physical location table, the physical memory addressing table, and metadata. The metadata may include one or more of performance numbers, usage patterns, availability data, system alarms, system alerts management information, billing data, cost data, and/or any other data associated with the DSN system.

The access module 80 may function to segment outbound corresponding information of the corresponding information into one or more outbound corresponding information segments in accordance with a data storage protocol, as previously discussed, when the DS processing module 34 functions to send the corresponding information to the DSN memory for storage. The access module 80 may function to aggregate one or more inbound corresponding information segments into inbound corresponding information of the corresponding information in accordance with the data storage protocol when the DS processing module 34 functions to retrieve the corresponding information from the DSN memory.

The grid module 82 may function to encode an outbound corresponding information segment of the one or more outbound corresponding information segments into a plurality of outbound encoded corresponding information slices in accordance with the error coding dispersal storage function when the DS processing function 34 functions to send the corresponding information to the DSN memory for storage. The grid module 82 may function to decode a plurality of inbound encoded corresponding information slices into an inbound corresponding information segment of the one or more inbound corresponding information segments in accordance with the error coding dispersal storage function when the DS processing function 34 functions to retrieve the corresponding information from the DSN memory.

The storage module 84 may function to output the plurality of outbound encoded corresponding information slices to the plurality of DS storage units when the DS processing function 34 functions to send the corresponding information to the DSN memory for storage. The storage module 84 may function to receive the plurality of inbound encoded corresponding information slices from the plurality of DS storage units when the DS processing function 34 functions to retrieve the corresponding information from the DSN memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A dispersed storage (DS) processing module comprises:
    a gateway module operable to:
        receive an incoming data object, wherein the incoming data object includes identifying information;
        verify the incoming data object based on the identifying information;
        when the incoming data object has been verified:
            receive user information associated with the incoming data object; and
            assign a source name to the incoming data object based on the user information,
            wherein the source name includes a file identifier and a vault identifier; and
        when the incoming data object has not been verified:
            reject the incoming data object; and
            notify a sender that the incoming data object has not been verified;
    an access module operable to:
        segment outbound data of the incoming data object into Y number of outbound data segments in accordance with a data storage protocol; and
        aggregate one or more inbound data segments into inbound data in accordance with the data storage protocol;
    a grid module operable to:
        encode the Y number of outbound data segments into a plurality of sets of outbound encoded data slices in accordance with an error coding dispersal storage function wherein each corresponding one of the outbound data segments is encoded via the error coding dispersal storage function into one of the plurality of sets of outbound encoded data slices containing n encoded data slices that require a threshold number k outbound encoded data slices for complete decoding of the corresponding one of the outbound data segments, and wherein k is less than n;
        generate a plurality of sets of slice names for the plurality of sets of outbound encoded data slices, wherein a slice name of the plurality of sets of slice names includes the source name, a segment number, and a slice number of an outbound encoded data slice of the plurality of sets of outbound encoded data slices, and wherein the slice name is used as a dispersed storage network (DSN) address for the outbound encoded data slice; and
        decode a plurality of inbound encoded data slices into the one or more inbound data segments in accordance with the error coding dispersal storage function; and
    a storage module operable to:
        output the plurality of sets of outbound encoded data slices based on the plurality of sets of slice names to a plurality of DS storage units for storage therein, wherein a first encoded data slice of each of a first and second set of encoded data slices is stored in a first DS storage unit of the plurality of DS storage units; and
        receive the plurality of inbound encoded data slices from the plurality of DS storage units.

2. The DS processing module of claim 1, wherein the data storage protocol comprises at least one of:
    a file storage system;
    a block storage system; and
    an aggregated block storage system.

3. The DS processing module of claim 1, wherein the identifying information comprises at least one of:
    metadata;
    a file system directory;
    a block number;
    a transaction message;
    a user device identity (ID); and
    a data object identifier.

4. The DS processing module of claim 3 further comprises:
    the access module further operable to:
        segment the identifying information into outbound information segments in accordance with the data storage protocol; and
        aggregate one or more inbound information segments into inbound identifying information in accordance with the data storage protocol;
    the grid module further operable to:
        encode the outbound information segments into a plurality of outbound encoded information slices in accordance with the error coding dispersal storage function; and
        decode a plurality of inbound encoded information slices into the one or more inbound information segments in accordance with the error coding dispersal storage function; and
    the storage module further operable to:
        output the plurality of outbound encoded information slices to the plurality of DS storage units corresponding to a pillar of stored slices; and
        receive the plurality of inbound encoded information slices from the plurality of DS storage units.

5. The DS processing module of claim 1 further comprises:
    the gateway module operable to communicate second data and second identifying information with a user device, wherein at least a portion of the second identifying information is substantially identical to at least a portion of the identifying information;

the access module operable to:
   segment outbound second data into one or more outbound second data segments in accordance with the data storage protocol; and
   aggregate one or more inbound second data segments into inbound second data in accordance with the data storage protocol;

the grid module operable to:
   encode the one or more outbound second data segments into a plurality of outbound encoded second data slices in accordance with the error coding dispersal storage function; and
   decode a plurality of inbound encoded second data slices into the one or more inbound second data segments in accordance with the error coding dispersal storage function; and the storage module operable to:
   output the plurality of outbound encoded second data slices to the plurality of DS storage units; and
   receive the plurality of inbound encoded second data slices from the plurality of DS storage units.

6. A dispersed storage (DS) processing module comprises:
a gateway module operable to:
   receive an incoming data object, wherein the incoming data object includes identifying information;
   verify the incoming data object based on the identifying information;
   when the incoming data object has been verified, receive user information associated with the incoming data object; and
   assign a source name to the incoming data object based on the user information, wherein the source name includes a file identifier and a vault identifier; and an access module operable to:
   segment the incoming data object into Y number of outbound data segments in accordance with a data storage protocol; and
   aggregate one or more inbound data segments into inbound data in accordance with the data storage protocol a grid module operable to:
   encode the Y number of outbound data segments into a plurality of sets of outbound encoded data slices in accordance with an error coding dispersal storage function, wherein each corresponding one of the outbound data segments is encoded via the error coding dispersal storage function into one of the plurality of sets of outbound encoded data slices containing n encoded data slices that require a threshold number k outbound encoded data slices for complete decoding of the corresponding one of the outbound data segments, and wherein k is less than n;
   generate a plurality of sets of slice names for the plurality of sets of outbound encoded data slices, wherein a slice name of the plurality of sets of slice names includes the source name, a segment number, and a slice number of an outbound encoded data slice of the plurality of sets of outbound encoded data slices, and wherein the slice name is used as a dispersed storage network (DSN) address for the outbound encoded data slice; and
   decode a plurality of inbound encoded data slices received from a plurality of DS storage units into the one or more inbound data segments in accordance with the error coding dispersal storage function.

7. The DS processing module of claim 6, wherein the data storage protocol comprises at least one of:
   a file storage system;
   a block storage system; and
   an aggregated block storage system.

8. The DS processing module of claim 6, wherein the identifying information comprises at least one of:
   a process identifier (ID);
   metadata;
   a file system directory;
   a block number;
   a transaction message;
   a user device identity (ID); and
   a data object identifier.

9. The DS processing module of claim 6 further comprises:
   the gateway module operable to communicate second data and second identifying information, wherein at least a portion of the second identifying information is substantially identical to at least a portion of the identifying information; and
   the access module operable to:
      segment outbound second data into one or more outbound second data segments in accordance with the data storage protocol; and
      aggregate one or more inbound second data segments into inbound second data in accordance with the data storage protocol.

10. A computer readable memory device comprises:
a first storage module that stores operational instructions that, when executed by a computing device, causes the computing device to:
   receive an incoming data object, wherein the incoming data object includes identifying information;
   verify the incoming data object based on the identifying information;
   when the incoming data object has been verified:
      receive user information associated with the incoming data object; and
      assign a source name to the incoming data object based on the user information; and
   when the incoming data object has not been verified:
      reject the incoming data object; and
      notify a sender that the incoming data object has not been verified;

a second storage module that stores operational instructions that, when executed by the computing device, causes the computing device to:
   encode Y number of outbound data segments generated from the data object into a plurality of sets of outbound encoded data slices in accordance with an error coding dispersal storage function, wherein each corresponding one of the outbound data segments is encoded via the error coding dispersal storage function into one of the plurality of sets of outbound encoded data slices containing n encoded data slices that require a threshold number k outbound encoded data slices for complete decoding of the corresponding one of the outbound data segments, and wherein k is less than n; generate a plurality of sets of slice names for the plurality of sets of outbound encoded data slices, wherein a slice name of the plurality of sets of slice names includes the source name, a segment number, and a slice number of an outbound encoded data slice of the plurality of sets of outbound encoded data slices, and wherein the slice name is used as a dispersed storage network (DSN) address for the outbound encoded data slice; and decode a plurality of inbound encoded data slices into one or more inbound data segments in accordance with the error coding dispersal storage function; and a third storage module that stores operational instructions that, when executed by the computing device, causes the computing device to:

output the plurality of sets of outbound encoded data slices based on the plurality of slice names to a plurality of DS storage units for storage therein, wherein a first encoded data slice of each of a first and second set of encoded data slices is stored in a first DS storage unit of the plurality of DS storage units; and receive the plurality of inbound encoded data slices from the plurality of DS storage units.

11. The computer readable memory device of claim 10 further comprises:

a fourth storage module that stores operational instructions that, when executed by the computing device, causes the computing device to segment incoming data object into Y number of outbound data segments.

12. The DS processing module of claim 1, wherein the data object is a data file.

13. The DS processing module of claim 1, wherein the data object is a data block.

14. The DS processing module of claim 1, wherein the data object is an aggregate block of data blocks.

15. The DS processing module of claim 6, wherein the data object is a data file.

16. The DS processing module of claim 6, wherein the data object is a data block.

17. The DS processing module of claim 6, wherein the data object is an aggregate block of data blocks.

* * * * *